United States Patent
Kurian

(10) Patent No.: US 10,817,598 B2
(45) Date of Patent: Oct. 27, 2020

(54) ENHANCED BIOMETRIC DATA AND SYSTEMS FOR PROCESSING EVENTS USING ENHANCED BIOMETRIC DATA

(71) Applicant: Bank of America Corporation, Charlotte, NC (US)

(72) Inventor: Manu Kurian, Dallas, TX (US)

(73) Assignee: Bank of America Corporation, Charlotte, NC (US)

(*) Notice: Subject to any disclaimer, the term of this patent is extended or adjusted under 35 U.S.C. 154(b) by 269 days.

(21) Appl. No.: 15/936,597

(22) Filed: Mar. 27, 2018

(65) Prior Publication Data

US 2019/0303558 A1     Oct. 3, 2019

(51) Int. Cl.
| | |
|---|---|
| *H04L 29/08* | (2006.01) |
| *G06F 21/45* | (2013.01) |
| *H04L 9/32* | (2006.01) |
| *G06F 9/54* | (2006.01) |
| *G06K 9/00* | (2006.01) |
| *G06K 9/62* | (2006.01) |

(52) U.S. Cl.
CPC .............. *G06F 21/45* (2013.01); *G06F 9/542* (2013.01); *G06K 9/00926* (2013.01); *H04L 9/3231* (2013.01); *H04L 67/306* (2013.01); *G06K 9/6201* (2013.01)

(58) Field of Classification Search
CPC ..... G06F 21/32; G06K 9/6201; H04L 67/306; H04L 9/3231; H04L 2209/80; H04W 12/00
See application file for complete search history.

(56) References Cited

U.S. PATENT DOCUMENTS

| | | |
|---|---|---|
| 7,096,496 B1 | 8/2006 | Challener et al. |
| 7,114,646 B2 | 10/2006 | Hillhouse |
| 7,174,459 B2 | 2/2007 | Kirkpatrick et al. |
| 7,894,634 B2 | 2/2011 | Chung |
| 8,984,282 B1 | 3/2015 | Kragh |
| 9,053,310 B2 | 6/2015 | Oberheide et al. |

(Continued)

FOREIGN PATENT DOCUMENTS

WO     2003095218 A1     11/2003

*Primary Examiner* — Olugbenga O Idowu
(74) *Attorney, Agent, or Firm* — Banner & Witcoff, Ltd.; Michael A. Springs

(57) ABSTRACT

Systems for generating enhanced biometric data and using enhanced biometric data to process events are provided. A system may receive a request for enhanced biometric data and may extract details associated with the request. Based on a user associated with the request and the extracted details, a user profile may be selected from a plurality of user profiles associated with the user. The user profile may include biometric data of the user, predetermined limits on types of events to be processed, amounts, and the like. The system may generate enhanced biometric data based on the user profile and may transmit the enhanced biometric data to a computing device of the requesting user. The user may then provide the enhanced biometric data when requesting to process an event. The system may evaluate the enhanced biometric data to determine whether it matches pre-stored biometric data and whether the event details are within the limits associated with the user profile from which the enhanced biometric data was generated. If so, the event may be processed.

22 Claims, 16 Drawing Sheets

(56) References Cited

U.S. PATENT DOCUMENTS

| | | |
|---|---|---|
| 9,420,457 B2 | 8/2016 | Gonsalves et al. |
| 9,454,656 B2 | 9/2016 | Oberheide et al. |
| 9,535,675 B2 | 1/2017 | Mohamad Abdul et al. |
| 9,608,809 B1 | 3/2017 | Ghetti et al. |
| 9,613,067 B2 | 4/2017 | Chang et al. |
| 9,672,335 B2 | 6/2017 | Shuart et al. |
| 9,686,275 B2 | 6/2017 | Chari et al. |
| 9,866,546 B2 | 1/2018 | Brannon |
| 9,871,770 B2 | 1/2018 | O'Hare et al. |
| 2009/0226052 A1 | 9/2009 | Fedele et al. |
| 2013/0336545 A1 | 12/2013 | Pritikin et al. |
| 2014/0157401 A1 | 6/2014 | Alameh et al. |
| 2016/0294557 A1 | 10/2016 | Baldwin et al. |
| 2017/0064549 A1 | 3/2017 | Rykowski et al. |
| 2019/0325407 A1* | 10/2019 | Zhou .................. G06Q 20/3274 |

* cited by examiner

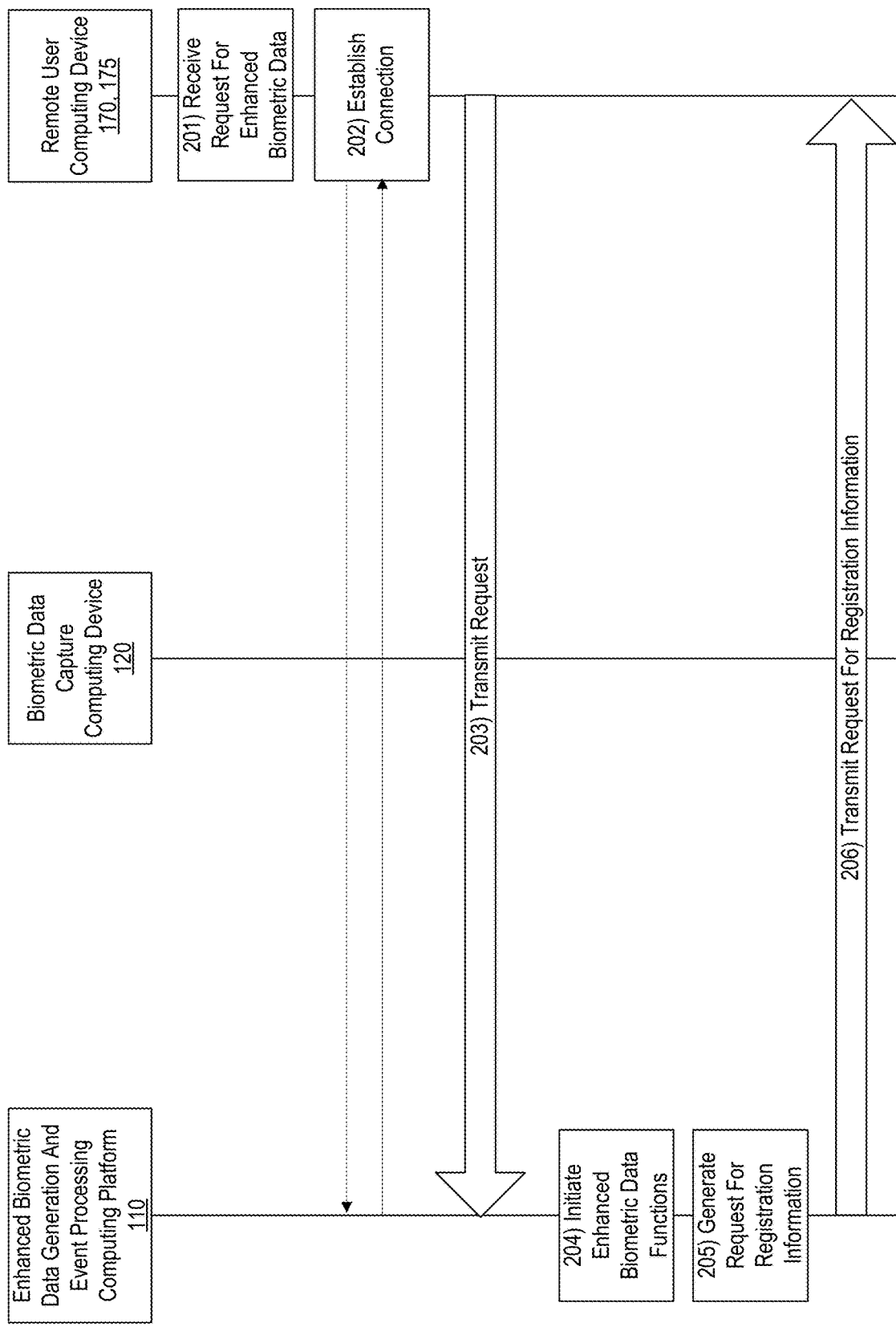

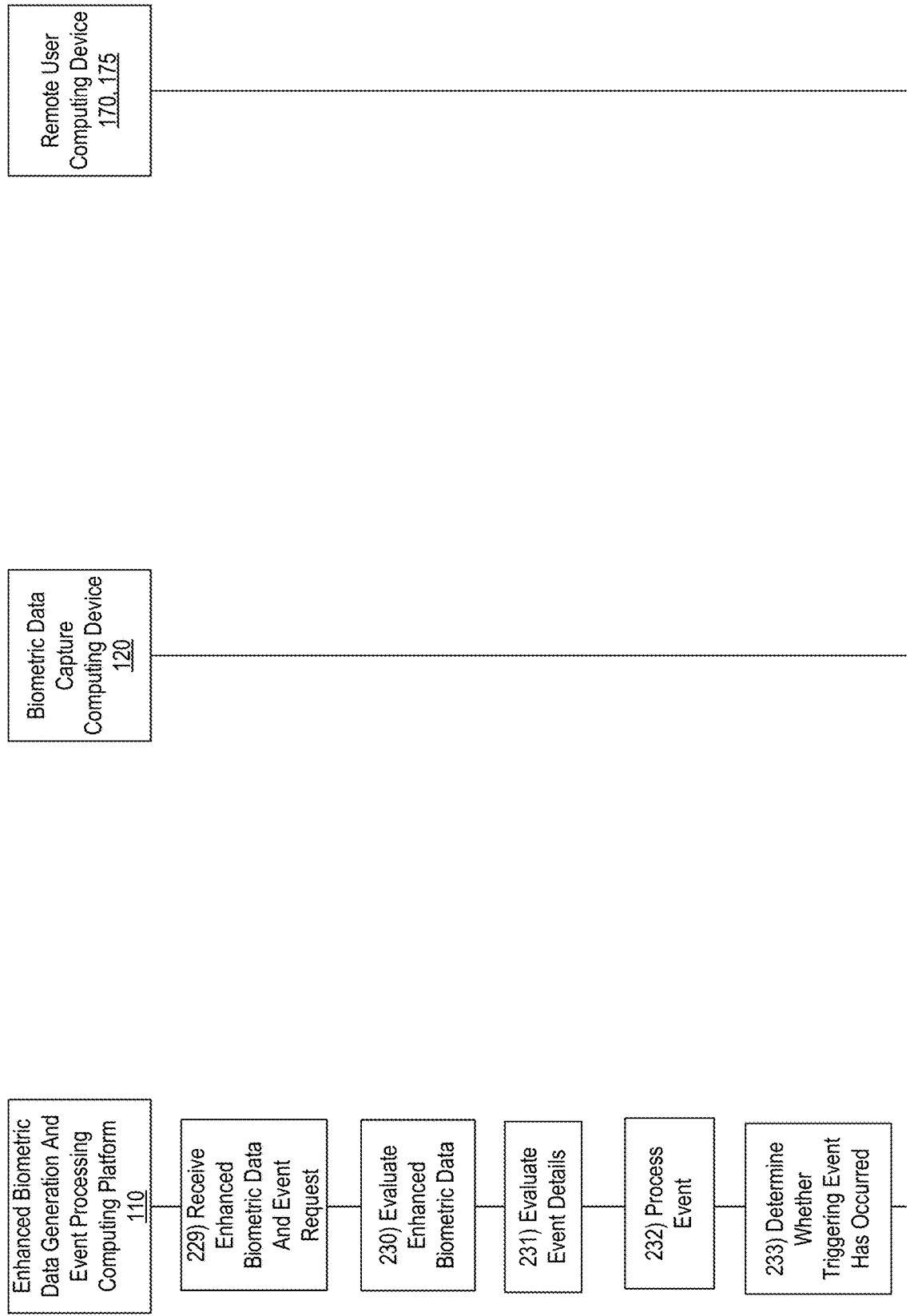

ENHANCED BIOMETRIC DATA AND SYSTEMS FOR PROCESSING EVENTS USING ENHANCED BIOMETRIC DATA

BACKGROUND

Aspects of the disclosure relate to electrical computers, systems, and devices. In particular, one or more aspects of the disclosure relate to generating and using enhanced biometric data in processing events.

The use of biometric data in event processing has become much more common. Many systems rely on biometric data to authenticate users, authorize processing of an event, such as a transaction, and the like. However, conventional systems rely on static biometric data (e.g., naturally occurring biometric data). Unfortunately, this data can be replicated and/or manipulated by unauthorized users to perform unauthorized activity. Further, conventional systems rely on the presence of the user associated with the biometric data to provide the biometric data. Accordingly, arrangements in which biometric data is modified to provide improved security and is accessible to authorized users other than the user associated with the biometric data may be advantageous.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with using static biometric data to process events.

In some examples, a system, computing platform, or the like, may receive a request for enhanced biometric data. If a user is not registered to the system, the system may register the user, including collecting biometric data of the user. Once the user is registered, or if the user is already registered, details associated with the request may be extracted. For instance, the request may include additional information associated with the request.

In some arrangements, based on a user associated with the request and the additional information, a user profile may be selected from a plurality of user profiles associated with the user. The user profile may include biometric data of the user, as well as predetermined limits on types of events to be processed, amounts, and the like. The system may then generate enhanced biometric data based on the user profile and may transmit the enhanced biometric data to a computing device of the requesting user.

In some examples, the user may then provide the enhanced biometric data (e.g., via an enhanced biometric data output) when requesting to process an event. The system may evaluate the enhanced biometric data to determine whether it matches pre-stored biometric data and whether the event details are within the limits associated with the user profile from which the enhanced biometric data was generated. If so, the event may be processed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for implementing enhanced biometric data generation and event processing functions in accordance with one or more aspects described herein;

DETAILED DESCRIPTION

Figure 1A:
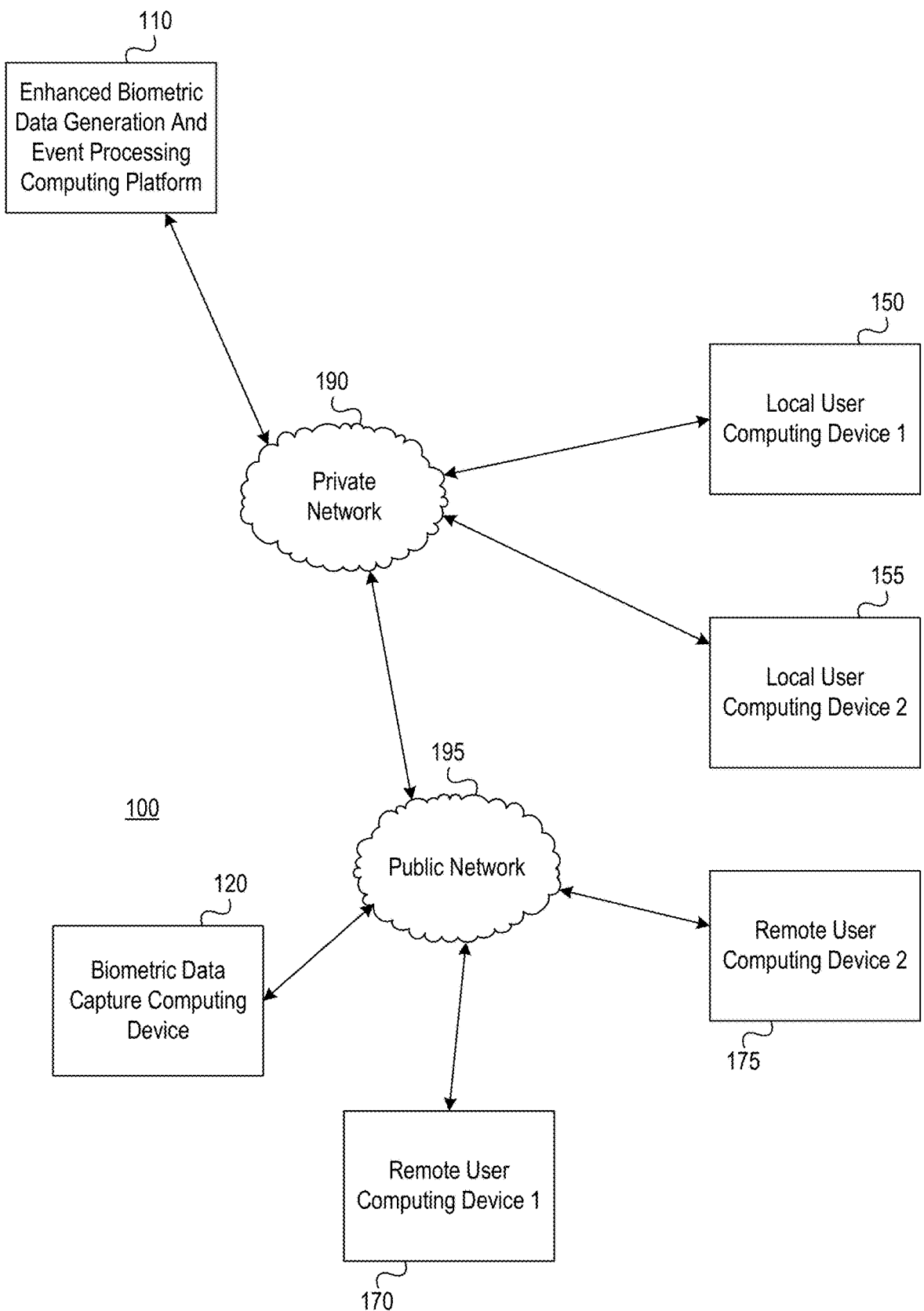
FIGS. 1A and 1B depict an illustrative computing environment for implementing enhanced biometric data generation and event processing functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to generating an using enhanced biometric data for event processing. The functions discussed herein may be performed in real-time or near real-time to facilitate secure and efficient event processing.

As discussed above, the use of biometric data in user authentication and event processing authorization is becoming more common. However, conventional systems rely on naturally occurring biometric data, such as fingerprint, voice print, iris or retinal scan, or the like. This is static data that, once obtained by an unauthorized user, can be used to mimic the identity of the authorized user to conduct unauthorized activity.

Accordingly, the arrangements described herein provide a flexible, secure alternative to conventional systems that rely on static data. The arrangements described herein allow for generation of enhanced biometric data that include some or all of the naturally occurring biometric data, while including additional, machine readable data, that can be used to control use of the enhanced biometric data. For instance, a user may establish a plurality of user profiles. Each user profile of the plurality of user profiles may include different limits or controls to implement in the use of the enhanced biometric data generated from the respective user profile. For example, a user may have a user profile that will be valid for a predetermined period of time and may permit only events up to a predetermined amount to be processed.

Accordingly, a user may request enhanced biometric data and the system may generate the enhanced biometric data based on a selected user profile. Any limits, controls, or the like, may be encoded into the enhanced biometric data such that it can be read when the enhanced biometric data is provided with an event processing request.

Once the enhanced biometric data is generated, it may be transmitted to a computing device of the requesting user, to a computing device of another user, or the like. The computing device may then generate an enhanced biometric data output. The enhanced biometric data output may include a projected image of the enhanced biometric data (e.g., biometric data of the user and additional machine readable data). In other examples, the enhanced biometric output may be an adhesive device that may be a sticker, temporary tattoo, or the like. The adhesive device may adhere to a body part of a user, a mobile device, a wearable device, or the like. In some examples, the adhesive device may be transparent or semi-transparent to permit biometric data of a user to be viewed through a portion of the enhanced biometric data output while the machine readable data overlays a portion of the biometric data.

The enhanced biometric data may then be provided during a request for event processing, such as a transaction request. For instance, a user may provide the enhanced biometric data via the enhanced biometric data output to authenticate the user, authorize processing of the event, or the like.

These and various other arrangements will be discussed more fully below.

Figure 1B:
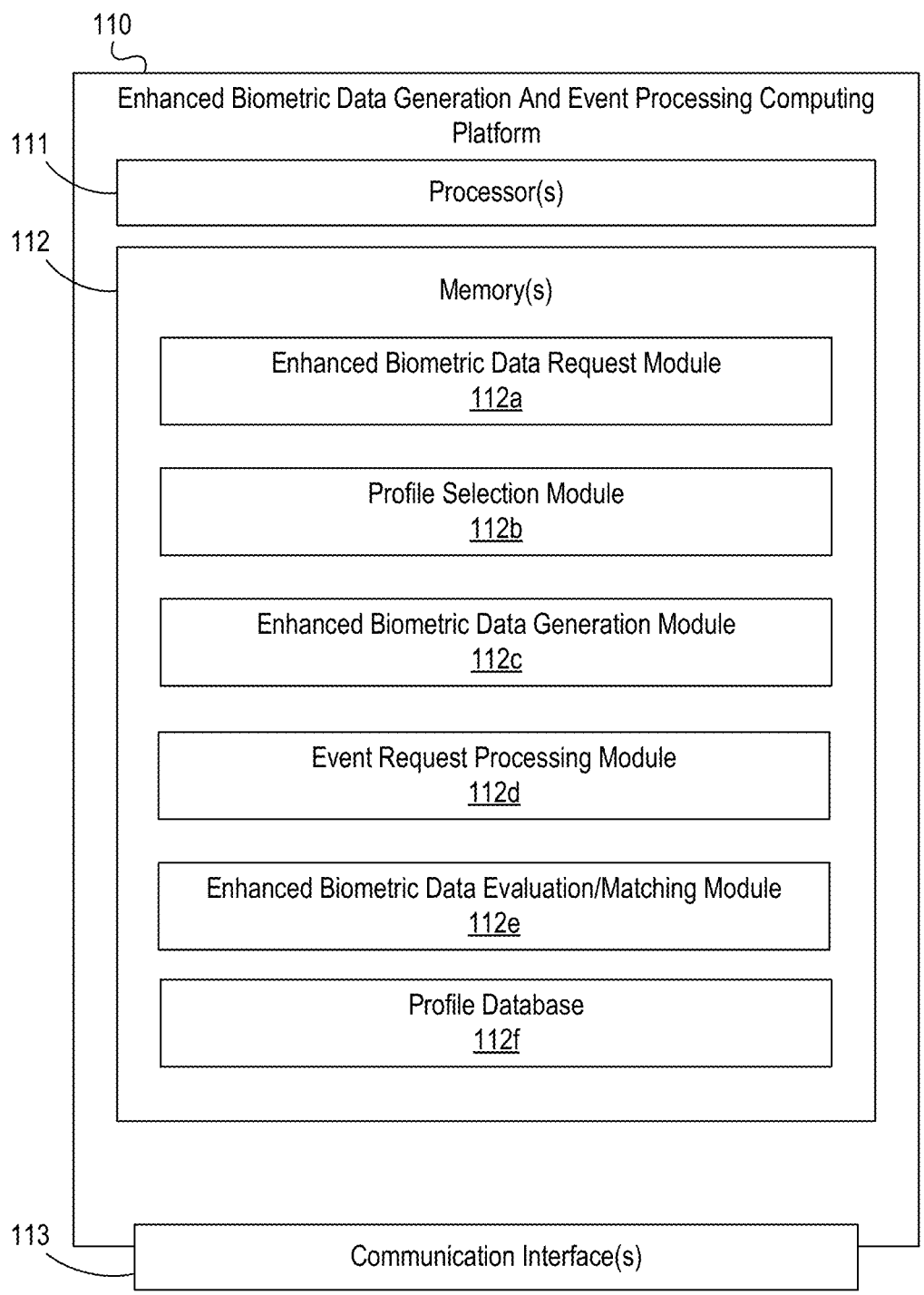

FIGS. 1A and 1B depict an illustrative computing environment for implementing and using a system for generating enhanced biometric data and processing events based on the enhanced biometric data in accordance with one or more aspects described herein. Referring to FIG. 1A, computing environment 100 may include one or more computing devices and/or other computing systems. For example, computing environment 100 may include an enhanced biometric data generation and event processing computing platform 110, a biometric data capture computing device 120, a first local user computing device 150, a second local user computing device 155, a first remote user computing device 170, and a second remote user computing device 175.

Enhanced biometric data generation and event processing computing platform 110 may be configured to perform various functions associated with generating enhanced biometric data and processing events based on the enhanced biometric data. In some examples, a user may request enhanced biometric data. The enhanced biometric data may be used in event processing functions to improve security, privacy, avoid unauthorized activity, and the like. The enhanced biometric data may include enhanced fingerprint data, enhanced voice print data, enhanced iris or retinal data, and the like.

A user may register with the system including providing identifying information, biometric data and the like. In some examples, a plurality of profiles for the user may be generated. In some arrangements, each profile may include different event limits (e.g., amount, type of event, or the like). Accordingly, enhanced biometric data may be generated including the limits associated with a particular profile in order to control events processed using the enhanced biometric data.

After registration, a user may request enhanced biometric data. Accordingly, the enhanced biometric data generation and event processing computing platform 110 may generate enhanced biometric data. The enhanced biometric data may include some or all of a user's actual biometric data but may temporarily modify some portion of the biometric data or may temporarily add additional data, such as machine readable data. Accordingly, the user may be authenticated for event processing from the actual biometric data and the temporarily modified or added data may be used to control limits on events being processed.

The user may provide the enhanced biometric data to the enhanced biometric data generation and event processing computing platform 110 when requesting processing of an event. The enhanced biometric data generation and event processing computing platform 110 may then evaluate the enhanced biometric data to ensure the data matches prestored data and to ensure that event details are within limits associated with the profile associated with the enhanced biometric data. If so, the event may be processed. If not, the event processing request may be rejected or denied.

Biometric data capture computing device 120 may include one or more computing devices configured to capture biometric data during an event (e.g., at a vendor, service provider, or the like). For instance, the user may request processing of an event and may submit, via the biometric data capture computing device 120, enhanced biometric data. In some examples, the biometric data capture computing device 120 may be part of or associated with a point-of-sale or other system used by a vendor, service provider, merchant, or the like, to process events, such as transactions. The biometric data capture computing device 120 may transmit the enhanced biometric data to the enhanced biometric data generation and event processing computing platform 110 for evaluation.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to control or implement aspects of the functions performed by enhanced biometric data generation and event processing computing platform 110.

The remote user computing devices 170, 175 may be used to communicate with, for example, enhanced biometric data generation and event processing computing platform 110, request event processing, request enhanced biometric data, and the like.

In one or more arrangements, biometric data capture computing device 120, local user computing device 150, local user computing device 155, remote user computing device 170, and/or remote user computing device 175 may be any type of computing device or combination of devices capable of performing the particular functions described herein. For example, biometric data capture computing device 120, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of biometric data capture computing device 120, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include enhanced biometric data generation and event processing computing platform 110. As illustrated in greater detail below, enhanced biometric data generation and event processing computing platform 110 may include one or more computing devices configured to perform one or more of the functions described herein. For example, enhanced biometric data generation and event processing computing platform 110 may include one or more computers (e.g., laptop computers, desktop computers, servers, server blades, or the like).

As mentioned above, computing environment 100 also may include one or more networks, which may interconnect one or more of enhanced biometric data generation and event processing computing platform 110, biometric data capture computing device 120, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, enhanced biometric data generation and event processing computing platform 110, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect enhanced biometric data generation and event processing computing platform 110, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., enhanced biometric data generation and event processing computing platform 110, local user computing device 150, local user computing device 155) with one or more networks and/or computing devices that are not associated with the organization. For example, biometric data capture computing device 120, remote user computing device 170, and/or remote user computing device 175 might not be associated with an organization that operates private network 190 (e.g., because biometric data capture computing device 120, remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the internet) that connect biometric data capture computing device 120, remote user computing device 170 and remote user computing device 175 to private network 190 and/or one or more computing devices connected thereto (e.g., enhanced biometric data generation and event processing computing platform 110, local user computing device 150, local user computing device 155).

Referring to FIG. 1B, enhanced biometric data generation and event processing computing platform 110 may include one or more processors 111, memory 112, and communication interface 113. A data bus may interconnect processor(s) 111, memory 112, and communication interface 113. Communication interface 113 may be a network interface configured to support communication between enhanced biometric data generation and event processing computing platform 110 and one or more networks (e.g., private network 190, public network 195, or the like). Memory 112 may include one or more program modules having instructions that when executed by processor(s) 111 cause enhanced biometric data generation and event processing computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of enhanced biometric data generation and event processing computing platform 110 and/or by different computing devices that may form and/or otherwise make up enhanced biometric data generation and event processing computing platform 110.

For example, memory 112 may have, store, and/or include an enhanced biometric data request module 112a. Enhanced biometric data request module 112a may store instructions and/or data that may cause or enable the enhanced biometric data generation and event processing computing platform 110 to receive a request for enhanced biometric data and process the request. For instance, a user may request enhanced biometric data via a remote user computing device 170, 175, which may be transmitted to the enhanced biometric data generation and event processing computing platform 110. The enhanced biometric data request module 112a may receive the request and generate a request for user information and biometric data. The user may provide the requested information, such as name or other identifier, account information, profile information (e.g., limits for different profiles), and the like. In addition, the user may provide biometric data, such as a fingerprint, voice print, iris or retinal scan, or the like. In some examples, the biometric data may be collected via the remote user computing device 170, 175 which may, in some examples, be a mobile computing device of the user, such as a smartphone, tablet, or the like. The enhanced biometric data request module 112a may then register the user and create and/or store one or more profiles (e.g., including user information, limits, biometric data, and the like) associated with the user. The profiles may include a plurality of profiles having different event limits, event type controls, and the like. In some examples, the plurality of profiles may be stored in a database, such as profile database 112f.

Additionally or alternatively, the enhanced biometric data request module 112a may store instructions and/or data that may cause or enable the enhanced biometric data generation and event processing computing platform 110 to receive a request for enhanced biometric data and process the request. For instance, the enhanced biometric data request module 112a may receive a request for enhanced biometric data from, for example, remote user computing device 170, 175. The enhanced biometric data request module 112a may then process the request. For instance, the enhanced biometric data request module 112a may identify a user associated with the request, an account associated with the user, a second user to whom the enhanced biometric data should be transmitted, or the like.

The enhanced biometric data generation and event processing computing platform 110 may further have, store and/or include a profile selection module 112b. The profile selection module 112b may store instructions and/or data that may cause or enable the enhanced biometric data generation and event processing computing platform 110 to select a user profile from a plurality of user profiles (e.g., plurality of user profiles for each user) for association with the requested enhanced biometric data. In some examples, a request for enhanced biometric data may include identification of a profile for use. In other examples, the request for enhanced biometric data may include details associated with a time period for which the enhanced biometric data should be active, amount limits for events to be processed, types of events to be processed, and the like. The profile selection module 112b may receive this information and may automatically select an appropriate profile for use based on the data. The appropriate profile may then be selected and retrieved from the profile database 112f.

The enhanced biometric data generation and event processing computing platform 110 may further have, store and/or include enhanced biometric data generation module 112c. Enhanced biometric data generation module 112c may store instructions and/or data that may cause or enable the enhanced biometric data generation and event processing computing platform 110 to generate enhanced biometric data. For instance, the enhanced biometric data generation module 112c may retrieve biometric data provided by the user and data associated with a selected profile and, using the biometric data and profile data, may generate enhanced biometric data. In some examples, the enhanced biometric data may include a sufficient portion of the biometric data to permit the system to identify and/or authenticate a user when an event is requested. Further, the enhanced biometric data may include encoded data controlling an amount, type, or the like, of event that may be processed using the enhanced biometric data.

In some examples, the enhanced biometric data may include an image that may be transmitted to a remote user computing device 170, 175. The image may then be projected (e.g., via an application executing on the remote user computing device 170, 175) onto a body part of a user. For instance, the image may be projected onto a fingertip of a user, or onto a fingerprint reading device, such as biometric data capture computing device 120, for use in processing the event. In some arrangements, the projected image may include a portion of the fingerprint of the user as well as temporarily modified data indicating limits, and the like. In other examples, the projected image may overlay the fingerprint of the user such that the user's fingerprint, or portion thereof, may be visible through portions of the overlay and portions may be temporarily modified by projection data including profile limits, and the like. In other examples, an entire fingerprint of the user may be visible while areas around the fingerprint may include the projected image including the profile data. In still other examples, the projected image may be configured to overlay the user's fingerprint such that fingerprint data is read from the projected image rather than the actual fingerprint of the user.

In other examples, the enhanced biometric data may be transmitted to a remote user computing device 170, 175 and may be printed onto an adhesive device, such as a sticker, temporary tattoo, or the like. The enhanced biometric data (e.g., image of biometric data and other, machine readable data) may be printed and the user may adhere the enhanced biometric data to a body part. Similar to the arrangements discussed above, the adhesive device may be transparent allowing a portion of the user's biometric data, such as a fingerprint, to be read through the adhesive device while additional data on the adhesive device may include encoded data including event limits, and the like, based on the user profile. In another example, the adhesive device may be opaque and may include an image of the user's biometric data, or portion thereof, as well as other temporary data modifying the biometric data to include the profile limits or including additional data providing the limits imposed based on the profile.

In some examples, enhanced biometric data may be used by the user requesting the event. In other examples, the enhanced biometric data may be transmitted to another user, such as a child, caretaker, authorized agent of the user, and the like. In examples in which an adhesive device is used, the adhesive device may be configured to adhere to a body part of a user, to a mobile device, wearable device, or the like.

In some arrangements, the enhanced biometric data generation module 112c may control a time period for which the enhanced biometric data may be activated. For instance, the enhanced biometric data may be generated for one time use and, after use, may be deactivated. In another example, the enhanced biometric data may be activated for a predetermined amount of time, date range, or the like. Accordingly, after the predetermined amount of time has expired, the date range has passed, or the like, the enhanced biometric data may be deactivated.

The enhanced biometric data generation and event processing computing platform 110 may further have, store and/or include event request processing module 112d. Event request processing module 112d may store instructions and/or data that may cause or enable the enhanced biometric data generation and event processing computing platform 110 to receive a request to process an event from a user, such as from remote user computing device 170, 175. The request may include event details, such as parties involved, amount involved, type of event, and the like. The request may further include the enhanced biometric data generated and transmitted to the user. The event request processing module 112d may receive the data and may process the request. For instance, the event request processing module 112d may transmit the received enhanced biometric data to enhanced biometric data evaluation/matching module 112e. The enhanced biometric data evaluation/matching module 112e may store instructions and/or data configured to cause or enable the enhanced biometric data generation and event processing computing platform 110 to compare the enhanced biometric data to biometric data associated with the user (e.g., stored during the registration process). As discussed above, the enhanced biometric data may include a sufficient portion of the biometric data of the user to identify/authenticate the user. Accordingly, the enhanced biometric data evaluation/matching module 112e may evaluate the enhanced biometric data to determine whether it matches biometric data of the user. If so, additional processing may occur. If not, the requested event may be denied.

The enhanced biometric data evaluation/matching module 112e may transmit a result of the comparison to the event request processing module 112d and, based on the result, the event request processing module 112d may further evaluate the requested event. For instance, the enhanced biometric data may be analyzed or decoded to determine event limits (e.g., amount, type, or the like) within the enhanced biometric data. The event details may then be compared to the event limits to determine whether the requested event meets the criteria or limits associated with the enhanced biometric data. If so, the event may be processed. If not, the requested event may be denied.

FIGS. 2A-2G depict an illustrative event sequence for implementing and using enhanced biometric data generation and event processing functions in accordance with one or more aspects described herein. The events shown in the illustrative event sequence are merely one example sequence and additional events may be added, or events may be omitted, without departing from the invention.

Referring to FIG. 2A, at step 201, a request for enhanced biometric data may be received. For instance, a request for enhanced biometric data may be received via a remote user computing device 170, 175. In some examples, the request for enhanced biometric data may be a first request received from a user and requiring registration. In other examples, the user may already be registered and the request for enhanced biometric data might not require registration.

At step 202, a connection may be established between the remote user computing device 170, 175 and the enhanced biometric data generation and event processing computing platform 110. For instance, a first wireless connection may be established between the remote user computing device 170, 175 and the enhanced biometric data generation and event processing computing platform 110. While the wireless connection is established, the request for enhanced biometric data may be transmitted to the enhanced biometric data generation and event processing computing platform 110 at step 203.

At step 204, the request may be received and enhanced biometric functions may be initiated and/or activated. For instance, one or more functions associated with generating enhanced biometric data may be enabled.

At step 205, if the user is not previously registered (e.g., this is a first request for enhanced biometric data) a request for registration information may be generated. In some examples, the request may include a request for name, account numbers, profile information, amount limits per profile, event type limits per profile, biometric data (e.g., fingerprint, retinal scan, voice print, and the like), and the like.

At step 206, while the first wireless connection is established, the request for registration information may be transmitted to the remote user computing device 170, 175.

Figure 2B:
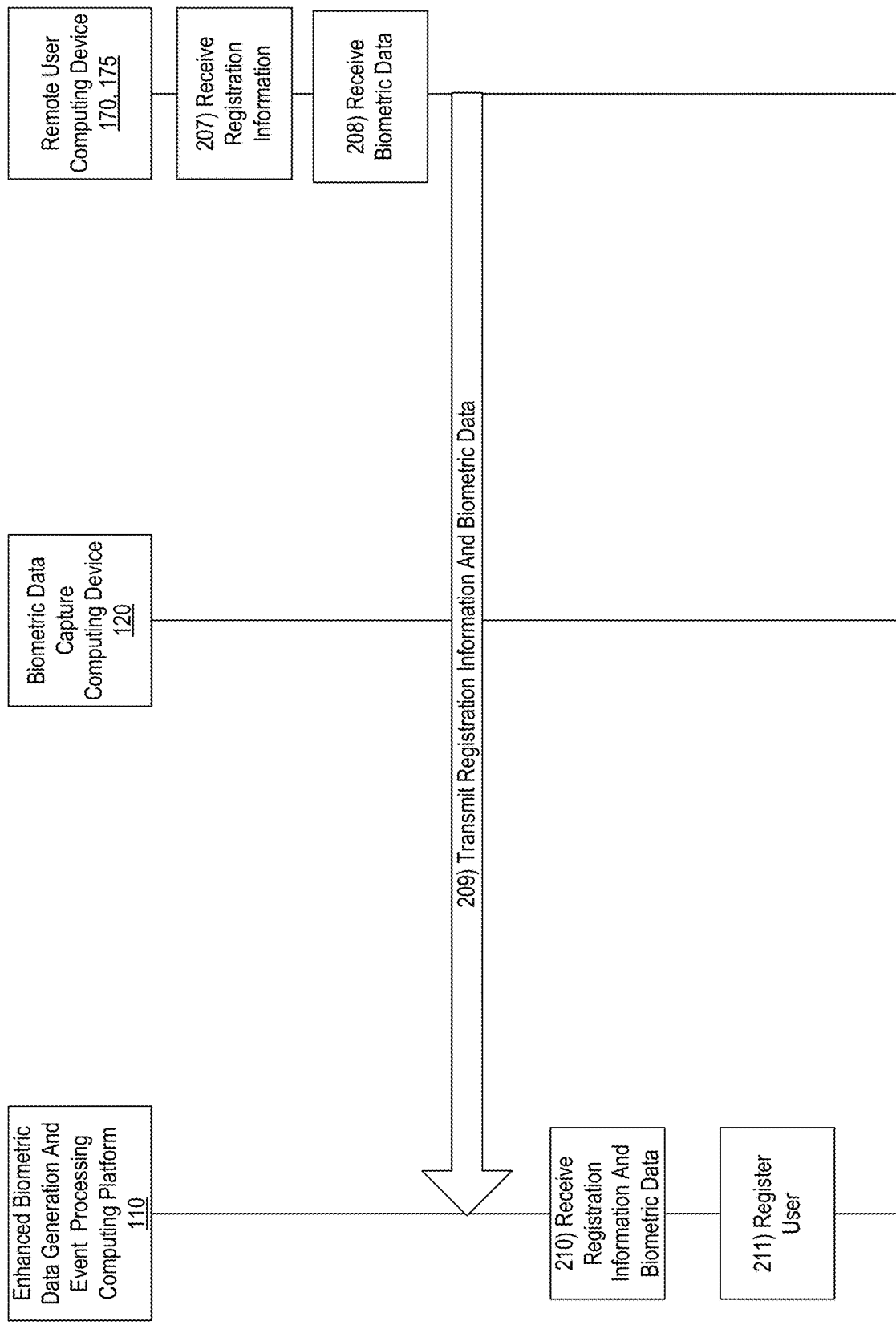

With reference to FIG. 2B, at step 207, the registration information may be received. For instance, registration may be received by the remote user computing device 170, 175. In some examples, the user may input registration information such as name or other identifier, contact information, account information, profile requests (e.g., amount limits, event type limits, and the like) into the remote user computing device 170, 175, which, in some examples, may be a mobile device of the user.

At step 208, biometric data of the user may be received by the remote user computing device 170, 175. In some examples, the user may provide biometric data such as fingerprint, voice print, retina or iris scan, and the like, via one or more sensors arranged in the remote user computing device 170, 175. In some examples, an application executing on the remote user computing device 170, 175 may be used to collect the biometric data.

At step 209, the registration information and biometric data may be transmitted to the enhanced biometric data generation and event processing computing platform 110. In some examples, the registration information and biometric data may be transmitted via the first wireless connection. In other examples, the first wireless connection might no longer be activate and a second wireless connection may be established to transfer the registration information and biometric data.

At step 210, the registration information and enhanced biometric data may be received by the enhanced biometric data generation and event processing computing platform 110. At step 211, the user may be registered. In some examples, registering the user may include generating a record associated with the user. The record may include the received user information and biometric information. Further, registering the user may include storing one or more user profiles associated with the user. Each user profile having various different limits or controls, as discussed herein.

As mentioned above, if a user is already registered with the system, steps 205 through 211 may be omitted.

Figure 2C:
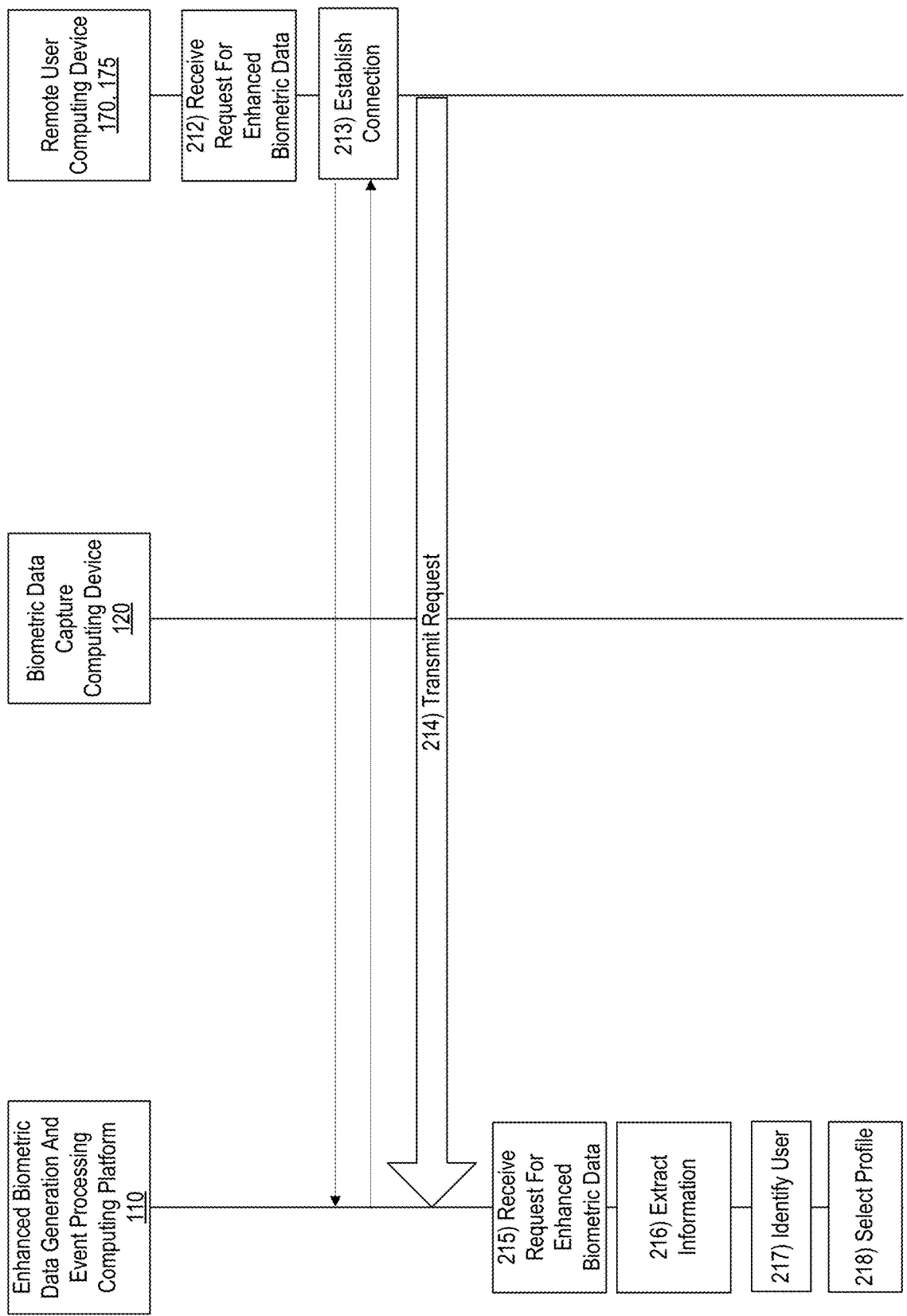

With reference to FIG. 2C, at step 212, a request for enhanced biometric data may be received. If the user requesting the enhanced biometric data is already registered, this request may be the same request as received at step 201. If the user was not previously registered, this request may be made subsequent to the request in step 201.

At step 213, a connection may be established between the remote user computing device 170, 175 and the enhanced biometric data generation and event processing computing platform 110. In some examples, a second wireless connection may be established and a communication session may be initiated.

While the communication session is established, the request may be transmitted to the enhanced biometric data generation and event processing computing platform 110 at step 214. At step 215, the request may be received by the enhanced biometric data generation and event processing computing platform 110.

At step 216, information may be extracted from the request. For instance, if a user has indicated a particular profile to use, that information may be extracted from the request. In another example, if the user has provided a date range or time period for which the enhanced biometric data should be valid, that information may be extracted. Additionally or alternatively, the request may include information associated with one or more users to which the enhanced biometric data should be transmitted (e.g., the requesting user, another user, authorized agent, or the like). This information may also be extracted. Other types of information may also be extracted.

At step 217, a user may be identified based on the received request, extracted information, or the like. At step 218, based on the identified user and extracted information, a user profile may be selected at step 218. For instance, based on the extracted information associated with the user, event, activation period, and the like, a user profile may be selected from a plurality of user profiles. The selected user profile may include data that may be encoded into the enhanced biometric data.

Figure 2D:
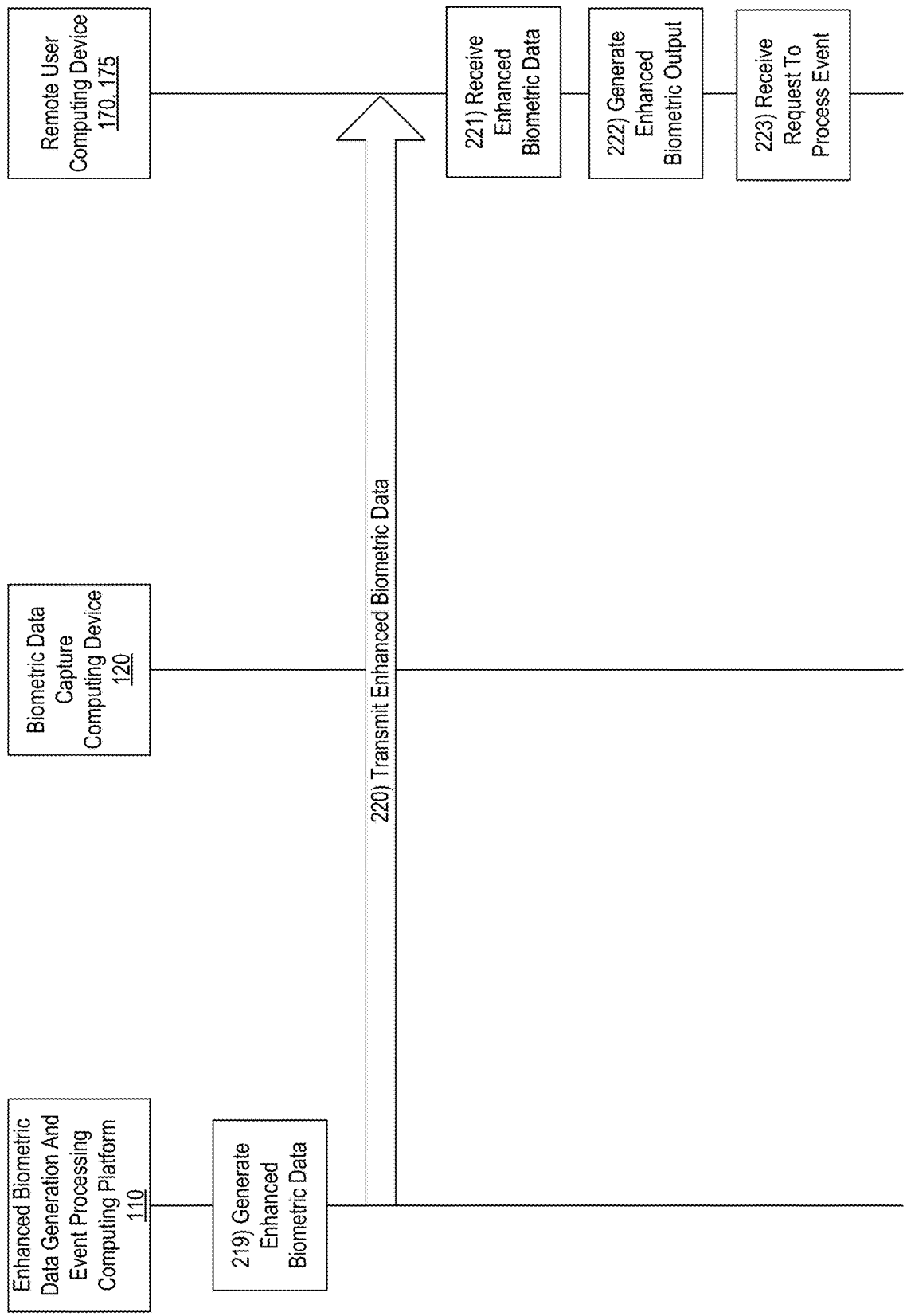

With reference to FIG. 2D, at step 219, the enhanced biometric data may be generated. As discussed herein, the enhanced biometric data may include some or all of the actual biometric data of the user (e.g., fingerprint, or the like). In some examples, the enhanced biometric data may temporarily modify a portion of the biometric data to reflect the encoded limits based on the user profile selected. In another example, areas around the biometric data may be modified to include the encoded limit data.

At step 220, the enhanced biometric data may be transmitted to a remote user computing device 170, 175. In some examples, the enhanced biometric data may be configured to be projected onto a body part of a user or other device (e.g., projected using an application executing on the remote user computing device 170, 175). Additionally or alternatively, the enhanced biometric data may be transmitted and configured to be printed onto an adhesive device, such as a sticker, temporary tattoo, or the like.

In some examples, the enhanced biometric data may be transmitted to a requesting user or user associated with the user profile. In other examples, the enhanced biometric data may be transmitted to other users, such as an authorized agent of the requesting user or user associated with the user profile, caretaker of the requesting user or user associated with the user profile, or the like. Accordingly, the arrangements discussed herein not only provide increased security when using biometric data for event processing, but also enables other users (e.g., users other than those for whom the biometric data has been received) to use the biometric data of others in a modified fashion to process events.

At step 221, the enhanced biometric data may be received by the remote user computing device 170, 175. At step 222, an enhanced biometric output may be generated. For instance, the remote user computing device 170, 175 may project the enhanced biometric data onto a user or other device. In another example, the user may print the enhanced biometric data via an application executing on the remote user computing device and via a printing device connected thereto. The enhanced biometric data may then be adhered to the user, other user, mobile device, wearable device, or the like.

At step 223, a request to process an event may be received. For instance, a user may request processing of an event via the remote user computing device 170, 175. In some examples, the requested event may be a transaction, such as a purchase, withdrawal, check cashing, or the like.

Figure 2E:
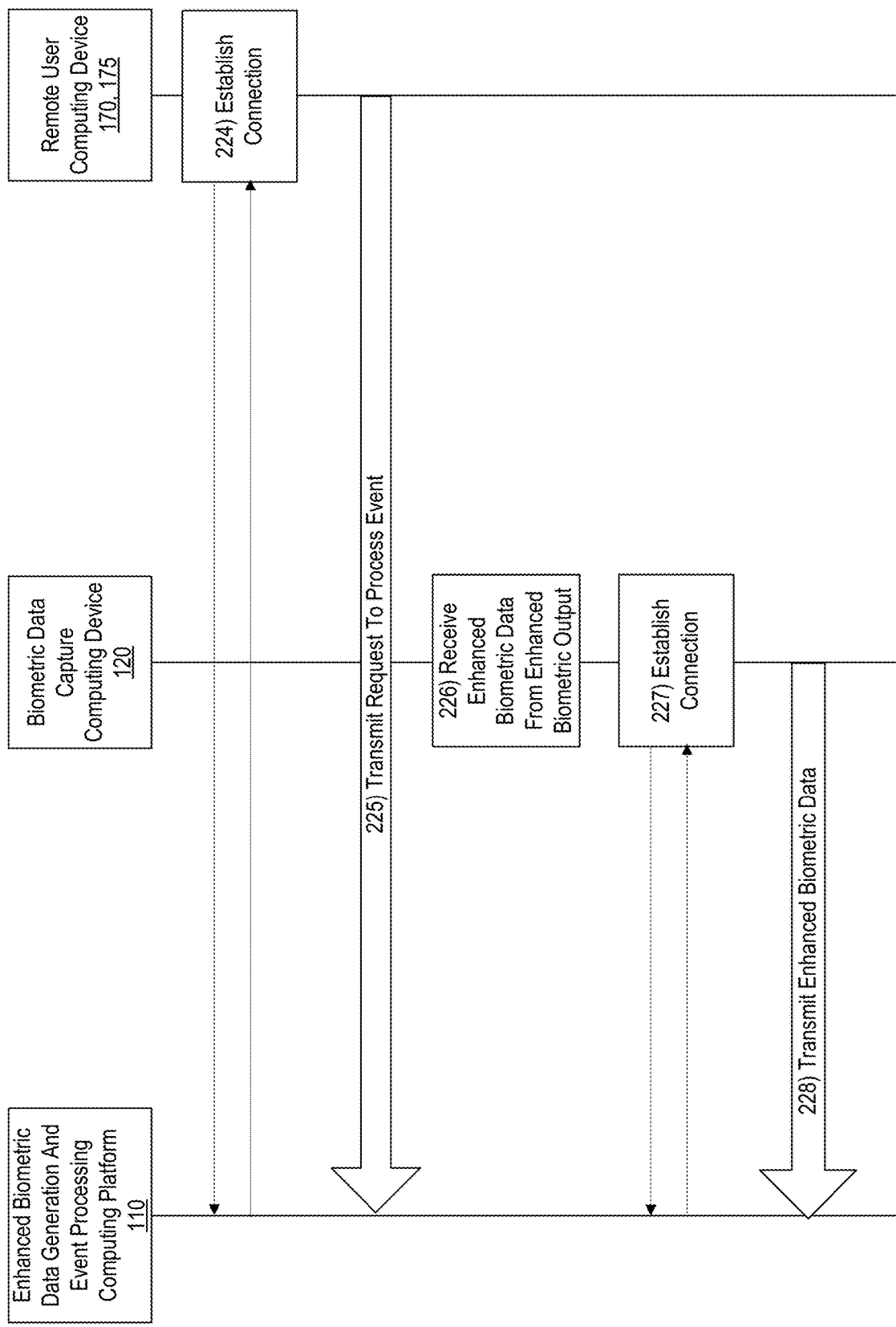

With reference to FIG. 2E, at step 224, a connection may be established between the remote user computing device 170, 175 and the enhanced biometric data generation and event processing computing platform 110. For instance, a third wireless connection may be established between the remote user computing device 170, 175 and the enhanced biometric data generation and event processing computing platform 110 and a communication session may be initiated.

After initiating the communication session associated with the third wireless connection, at step 225, the request to process the event may be transmitted to the enhanced biometric data generation and event processing computing platform 110. The request may include event details such as vendor name, amount of event, type of event, and the like.

At step 226, enhanced biometric data may be received via a biometric data capture computing device 120. For instance, the enhanced biometric output may be used to provide enhanced biometric data to a vendor system (e.g., point of sale system) or other system being used in processing the event via a biometric data capture computing device 120 associated with the system. At step 227, a connection may be established between the biometric data capture computing device 120 and the enhanced biometric data generation and event processing computing platform 110. For instance, another wireless communication session may be initiated and, during the wireless communication session the received enhanced biometric data may be transmitted to the enhanced biometric data generation and event processing computing platform 110 in step 228.

With reference to FIG. 2F, at step 229, the enhanced biometric data and request for event processing may be received by the enhanced biometric data generation and event processing computing platform 110. At step 230, the received enhanced biometric data may be evaluated. For instance, the enhanced biometric data may be compared to pre-stored biometric data associated with the user to determine whether the pre-stored biometric data matches the enhanced biometric data (or portion thereof reflecting the natural biometric data of the user). If not, the event request may be denied. If so, event details may be evaluated in step 231. For instance, event details may be compared to controls or limits extracted from the enhanced biometric data and based on the selected user profile. If the event details do not meet the controls or limits extracted from the enhanced biometric data, the event request may be denied. If the event details are within the limitations extracted, the event may be processed. For instance, funds may be transferred from a user account to a vendor account, an instruction may be transmitted to a vendor system authorizing processing the event, and the like.

At step 233, the enhanced biometric data generation and event processing computing platform 110 may determine whether a triggering event has occurred. For instance, a triggering event may include expiration of a predetermined time period for which the enhanced biometric data was activated, a final date in a date range for which the enhanced biometric data was activated has passed, a single use of the enhanced biometric data has occurred (e.g., in the case of single-use enhanced biometric data).

Figure 2G:
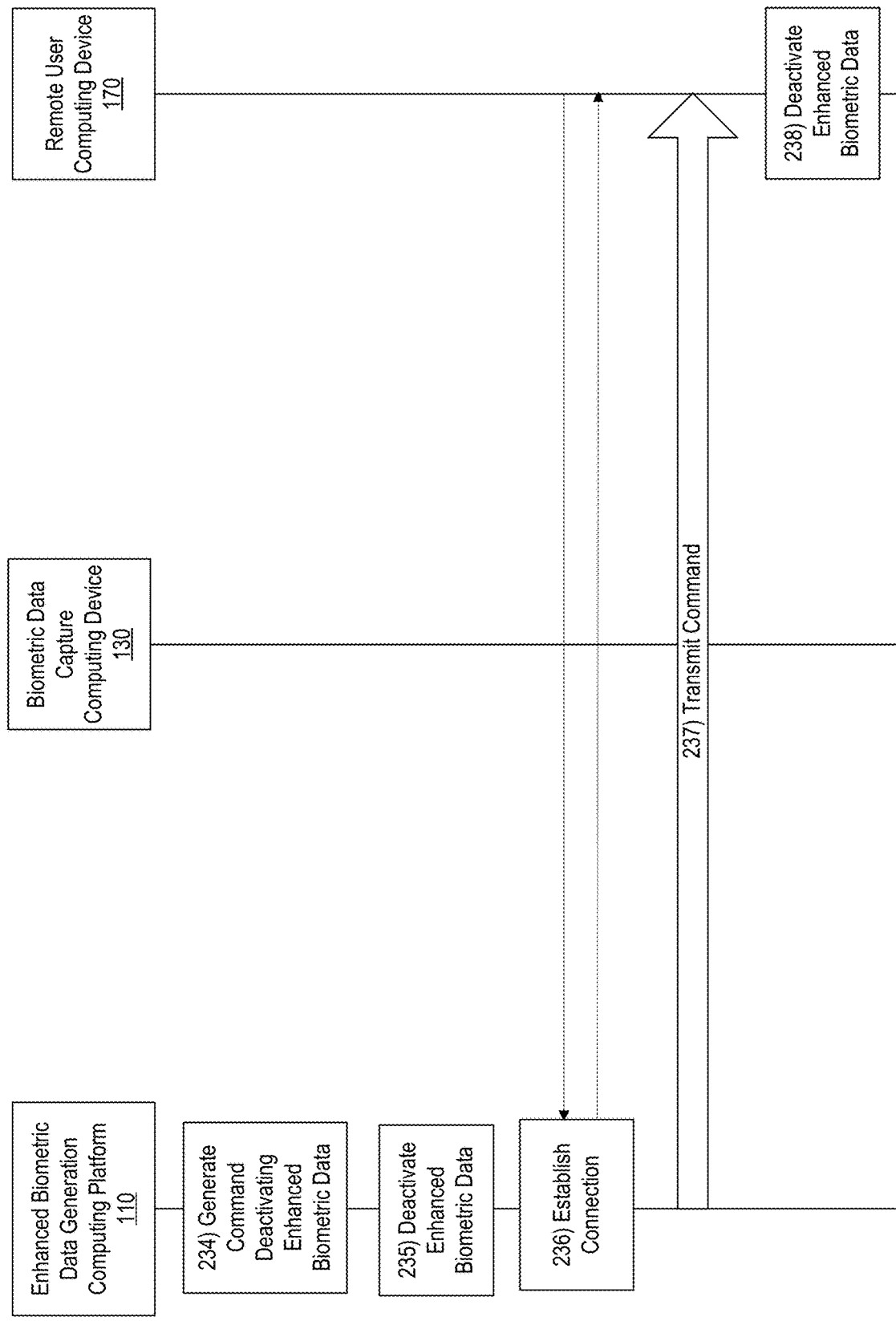

With reference to FIG. 2G, if a triggering event has occurred, at step 234 a command to deactivate the generated enhanced biometric data may be generated. At step 235, the enhanced biometric data may be deactivated at the enhanced biometric data generation and event processing computing platform 110. For instance, the enhanced biometric data generated and stored may be deleted or may be flagged such that an event requests including that enhanced biometric data are denied.

At step 236, a connection may be established between the enhanced biometric data generation and event processing computing platform 110 and the remote user computing device 170, 175. For instance, a wireless connection may be established and a communication session may be initiated. At step 237, after the communication session has been initiated, the generated command to deactivate the enhanced biometric data may be transmitted to the remote user computing device 170, 175. At step 238, the command may be received and the enhanced biometric data may be deactivated and/or deleted from the remote user computing device 170, 175.

Figure 3:
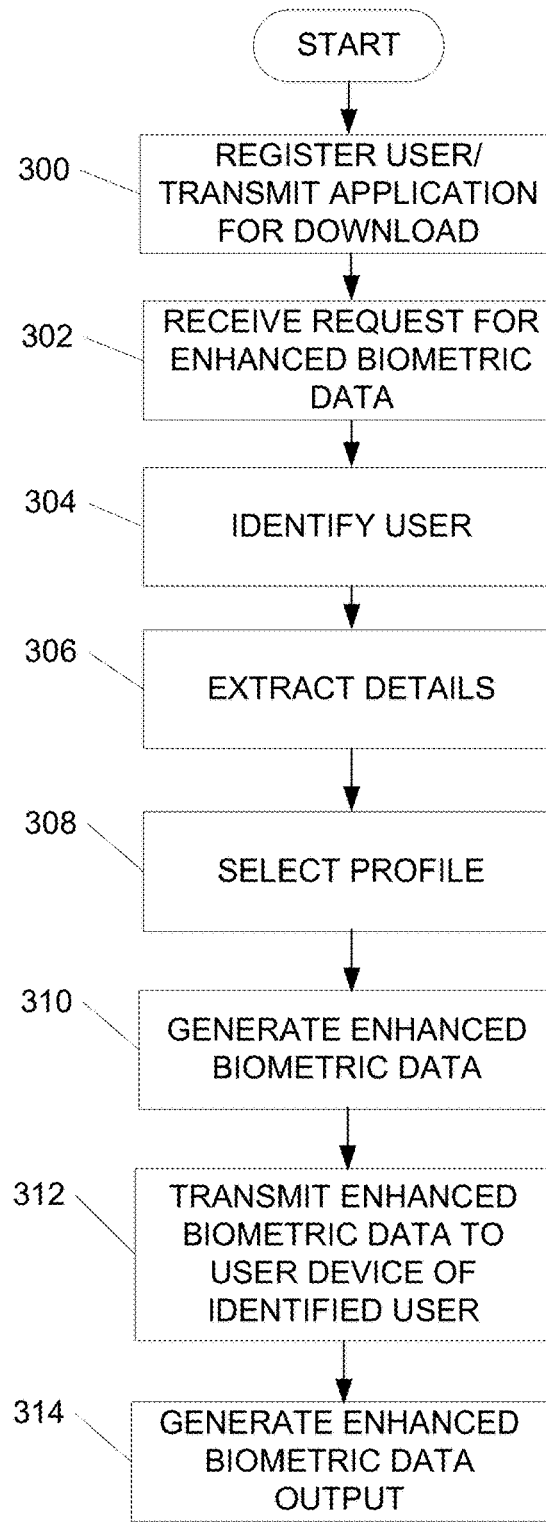
FIG. 3 depicts an illustrative method for implementing enhanced biometric data generation functions in accordance with one or more aspects described herein.

FIG. 3 is a flow chart illustrating one example method of generating enhanced biometric data according to one or more aspects described herein. The processes illustrated in FIG. 3 are merely some example processes and functions. The steps shown may be performed in a different order, more steps may be added, or one or more steps may be omitted without departing from the invention.

At step 300, a user may register with the enhanced biometric data generation and event processing computing platform 110. In examples in which the user is already registered, step 300 may be omitted. As discussed above, registering the user may including receiving user information, biometric information of the user, and the like. In some examples, registering the user may include transmitting, from the enhanced biometric data generation and event processing computing device 110 to the remote user computing device 170, 175 and application configured to perform one or more functions described herein. The application may then execute on the remote user computing device 170, 175.

At step 302, a request for enhanced biometric data may be received. For instance, a user may request, via the remote user computing device 170, 175, enhanced biometric data for use in processing one or more events, for use during a particular time period, or the like. In some examples, the request may include a particular user profile to associate with the enhanced biometric data, one or more desired limits or controls, or other details.

At step 304, the enhanced biometric data generation and event processing computing platform 110 may identify a user based on data included in the request for enhanced biometric data. For example, the enhanced biometric data generation and event processing computing platform 110 may identify the user based on an identifier associated with the remote user computing device 170, 175 from which the request was received, from user input, or the like.

At step 306, details may be extracted from the request. For instance, the enhanced biometric data generation and event processing computing platform 110 may extract details associated with a desired user profile, desired limits (e.g., amounts, types of events, or the like), a time period for which the enhanced biometric data should be active, and the like.

At step 308, based on the identified user and the extracted details, the enhanced biometric data generation and event processing computing platform 110 may select a user profile from a plurality of user profiles associated with the user. The selected user profile may include one or more criteria or limits extracted from the request.

At step 310, enhanced biometric data may be generated. For instance, the enhanced biometric data generation and event processing computing platform 110 may generate enhanced biometric data including at least a portion of the biometric data of the user and well as other data associated with the user profile, limits, and the like.

At step 312, the enhanced biometric data may be transmitted to the user. For instance, the enhanced biometric data generation and event processing computing platform 110 may transmit the generated enhanced biometric data to the remote user computing device 170, 175. At step 314, an enhanced biometric data output may be generated. For instance, the enhanced biometric data output may include projection of an image including the enhanced biometric data onto a body part of the user, user device, or the like. In some examples, the enhanced biometric data output may obscure a portion of the biometric data of the user (e.g., a fingerprint) and temporarily modify the overall fingerprint to permit a sufficient amount of biometric data to be recognized to identify or authenticate the user, while including data related to the user profile, limits, and the like. In other examples, the enhanced biometric data output may obscure the biometric data of the user and the output itself may include a reproduction of the biometric data or portion thereof, as well as additional data.

In some examples, the enhanced biometric data output may include an adhesive device, such as a sticker or temporary tattoo that the user may adhere to his or her body, a mobile device, a wearable device, or the like.

Figure 4:
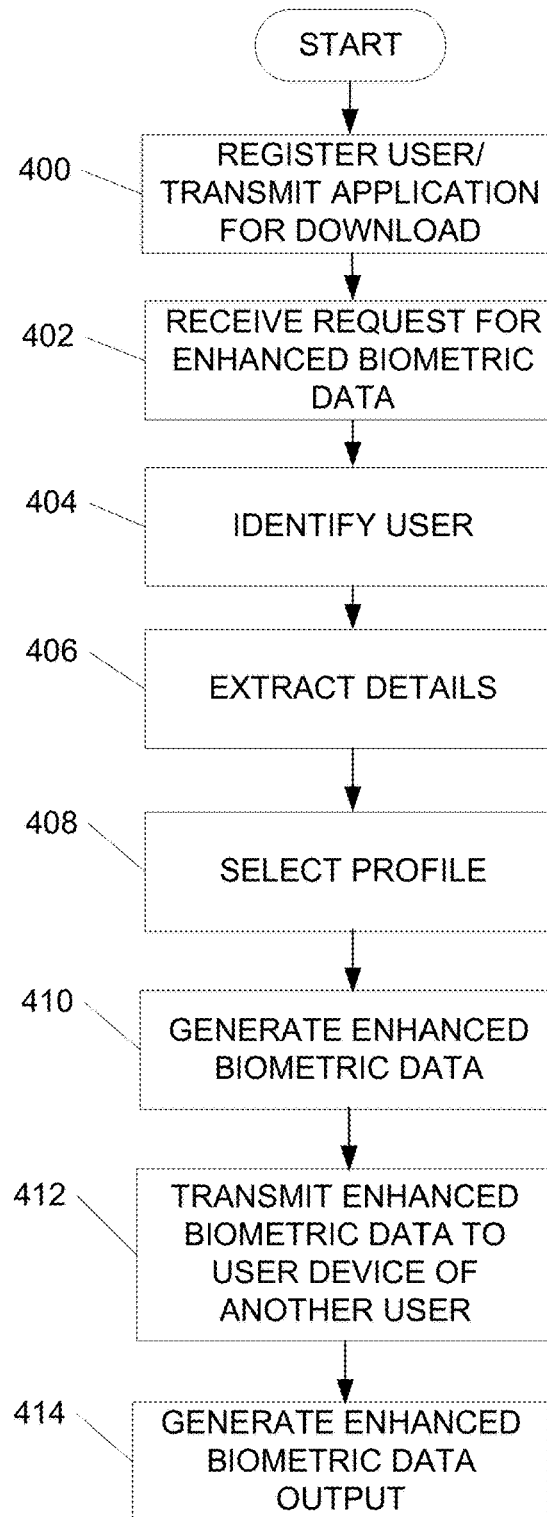
FIG. 4 depicts another illustrative method for implementing enhanced biometric data generation functions in accordance with one or more aspects described herein.

FIG. 4 is a flow chart illustrating another example method of generating enhanced biometric data according to one or more aspects described herein. The processes illustrated in FIG. 4 are merely some example processes and functions. The steps shown may be performed in a different order, more steps may be added, or one or more steps may be omitted without departing from the invention.

At step 400, a user may register with the enhanced biometric data generation and event processing computing platform 110. In examples in which the user is already registered, step 400 may be omitted. As discussed above, registering the user may including receiving user information, biometric information of the user, and the like. In some examples, registering the user may include transmitting, from the enhanced biometric data generation and event processing computing device 110 to the remote user computing device 170 and application configured to perform one or more functions described herein. The application may then execute on the remote user computing device 170. In some examples, the enhanced biometric data may be transmitted to another remote user computing device 175. In those examples, the application may be transmitted to the other remote user computing device 175 as well.

At step 402, a request for enhanced biometric data may be received. For instance, a user may request, via the remote user computing device 170, enhanced biometric data for use in processing one or more events, for use during a particular time period, or the like. In some examples, the request may include a particular user profile to associate with the enhanced biometric data, one or more desired limits or controls, or other details. Further, the request may be made by a user associated with the user profiles. In some examples, the request may further include instructions for or identification of a recipient to whom the enhanced biometric data should be sent, if someone other than the requesting user.

At step 404, the enhanced biometric data generation and event processing computing platform 110 may identify a user (e.g., the requesting user) based on data included in the request for enhanced biometric data. For example, the enhanced biometric data generation and event processing computing platform 110 may identify the user based on an identifier associated with the remote user computing device 170 from which the request was received, from user input, or the like.

At step 406, details may be extracted from the request. For instance, the enhanced biometric data generation and event processing computing platform 110 may extract details associated with a desired user profile, desired limits (e.g., amounts, types of events, or the like), a time period for which the enhanced biometric data should be active, and the like.

At step 408, based on the identified user and the extracted details, the enhanced biometric data generation and event processing computing platform 110 may select a user profile from a plurality of user profiles associated with the user. The selected user profile may include one or more criteria or limits extracted from the request.

At step 410, enhanced biometric data may be generated. For instance, the enhanced biometric data generation and event processing computing platform 110 may generate enhanced biometric data including at least a portion of the biometric data of the user and well as other data associated with the user profile, limits, and the like.

At step 412, the enhanced biometric data may be transmitted to the identified recipient (e.g., a person other than the requesting user). For instance, the enhanced biometric data generation and event processing computing platform 110 may transmit the generated enhanced biometric data to the another remote user computing device 175, other than the remote user computing device 170 from which the request was received. At step 414, an enhanced biometric data output may be generated. For instance, the enhanced biometric data output may include projection of an image including the enhanced biometric data onto a body part of the user, user device, or the like. In some examples, the enhanced biometric data output may obscure a portion of the biometric data of the user (e.g., a fingerprint) and temporarily modify the overall fingerprint to permit a sufficient amount of biometric data to be recognized to identify or authenticate the user, while including data related to the user profile, limits, and the like. In other examples, the enhanced biometric data output may obscure the biometric data of the user and the output itself may include a reproduction of the biometric data or portion thereof, as well as additional data.

In some examples, the enhanced biometric data output may include an adhesive device, such as a sticker or temporary tattoo that the user may adhere to his or her body, a mobile device, a wearable device, or the like.

Figure 5:
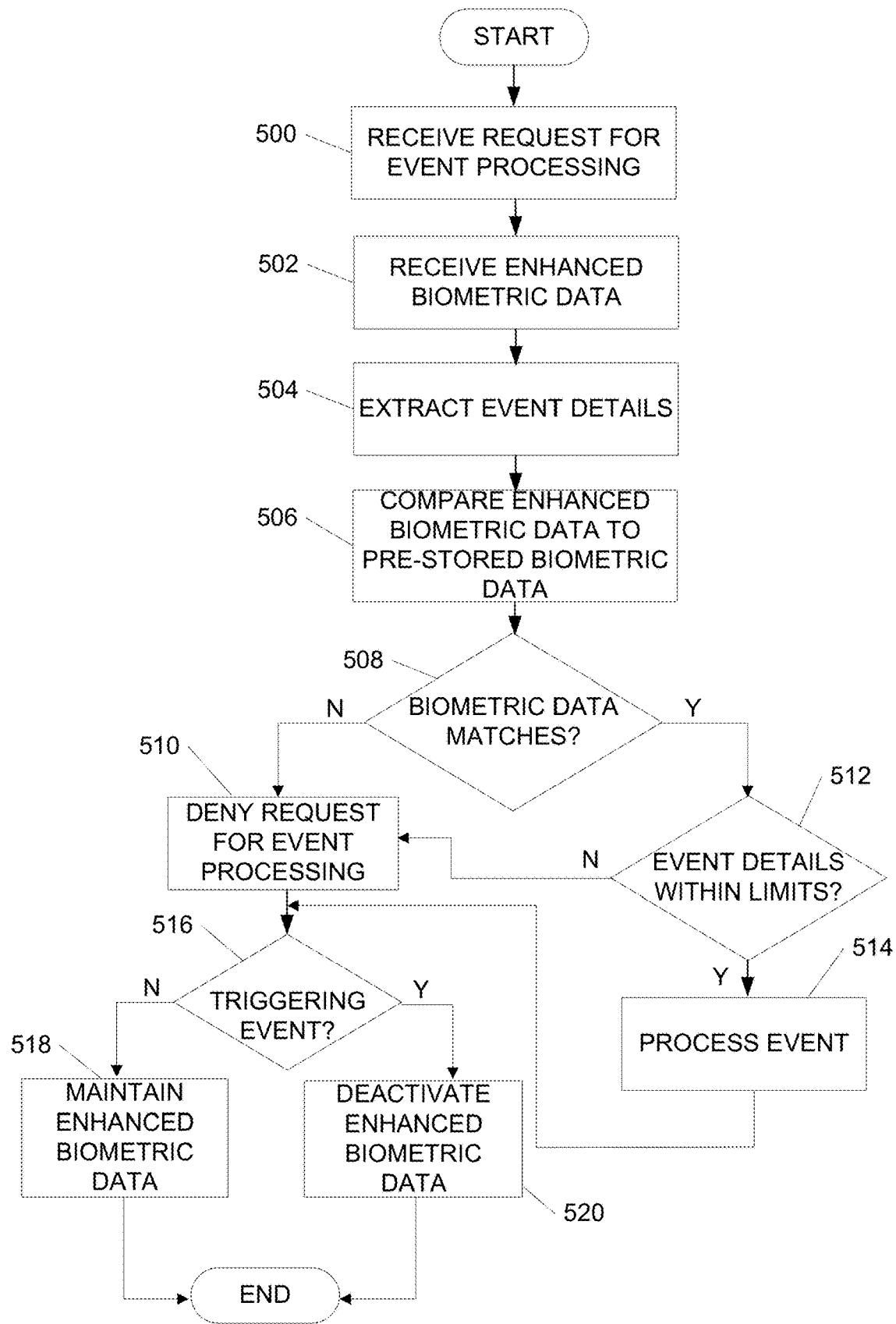
FIG. 5 depicts an illustrative method for implementing event processing functions using enhanced biometric data in accordance with one or more aspects described herein.

FIG. 5 is a flow chart illustrating one example method of processing an event using enhanced biometric data according to one or more aspects described herein. The processes illustrated in FIG. 5 are merely some example processes and functions. The steps shown may be performed in a different order, more steps may be added, or one or more steps may be omitted without departing from the invention.

At step 500, a request for event processing may be received. For instance, the enhanced biometric data generation and event processing computing platform 110 may receive a request to process an event from a remote user computing device 170, 175. In some examples, the remote user computing device requesting event processing may be associated with a user who requested the enhanced biometric data (e.g., remote user computing device 170 in FIG. 4). In other examples, the remote user computing device requesting event processing may be associated with another authorized user (e.g., remote user computing device 175 in FIG. 4). The request may include details of the event (e.g., amount, type, or the like).

At step 502, the enhanced biometric data may be received. For instance, a biometric data capture computing device 120 may capture the enhanced biometric data from the enhanced biometric data output and may transmit the enhanced biometric data to the enhanced biometric data generation and event processing computing platform 110.

At step 504, event details may be extracted from the request for event processing. For instance, a type of event, amount of event, vendor, or the like, may be extracted.

At step 506, the received enhanced biometric data may be compared to pre-stored biometric data for the user. In examples in which the enhanced biometric data is transmitted to the requesting user, the enhanced biometric data may be compared to the requesting user's biometric data. In examples in which the enhanced biometric data was transmitted to another authorized user, the enhanced biometric data may be compared to biometric data of the user associated with the user profile, request for enhanced biometric data, or the like.

At step 508, a determination may be made as to whether the enhanced biometric data matches the pre-stored biometric data. If not, the request for event processing may be denied at step 510. If so, the enhanced biometric data generation and event processing computing platform 110 may compare the extracted event details to criteria, limits, or the like extracted from the enhanced biometric data (e.g., based on the user profile data associated with the enhanced biometric data).

At step 512, a determination may be made as to whether the extracted event details are within the limits or criteria determined from the enhanced biometric data. If not, the request for event processing may be denied at step 510. If so, the event may be processed at step 514.

At step 516, a determination may be made as to whether a triggering event has occurred. As discussed herein, a triggering event may include expiration of a predetermined time period for which the enhanced biometric data was activated, the end of a predetermined date range, indication of a predetermined number of uses being reached, or the like. If a triggering event has not occurred at step 516, at step 518 the enhanced biometric data may remain activated. If, at step 516, a triggering event has occurred, the enhanced biometric data may be deactivated at step 520. For instance, the enhanced biometric data generation and event processing computing platform 110 may generate a command to deactivate, delete or the like, the enhanced biometric data. In some examples, the enhanced biometric data generation and event processing computing platform 110 may transmit the command to the remote user computing device 170, 175 to which the enhanced biometric data was transmitted to deactivate, delete, or the like, the enhanced biometric data on the remote user computing device 170, 175.

Figure 6A:
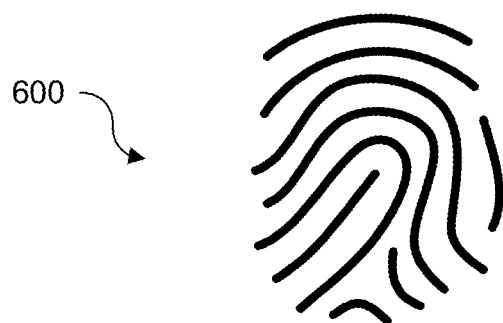
FIGS. 6A-6C illustrate examples of biometric data and enhanced biometric data in accordance with one or more aspects described herein.
Figure 6B:
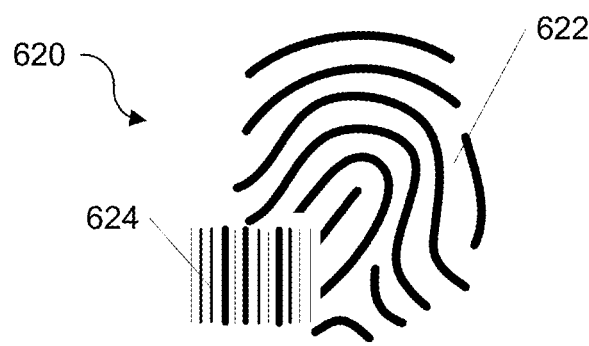
Figure 6C:

FIGS. 6A-6C illustrate some examples of biometric data and enhanced biometric data in accordance with one or more aspects described herein. FIG. 6A illustrates natural biometric data of a user, such as a fingerprint. The biometric data 600 includes a fingerprint of a user that may be provided via a registration process, as discussed herein. The biometric data 600 includes only the fingerprint of the user and no enhancements have been made to the biometric data 600.

FIG. 6B illustrates one example of enhanced biometric data. The enhanced biometric data 620 includes the naturally occurring fingerprint 622 of the user, as well as an enhancement 624 in the form of machine readable code. The enhancement 624 may be a bar code, quick response (QR) code, or other machine readable code. The enhancement 624 may include data associated with a user profile of the user (e.g., the user associated with the fingerprint 622), such as event limits, types of events permitted for processing, and the like. In some examples, the enhancement 624 may overlay a portion of the fingerprint 622, such that the enhancement 624 may temporarily modify the fingerprint data. In other examples, the enhancement 624 may be semi-transparent to permit portions of the fingerprint 622 to be visible and/or readable through the enhanced portion to temporarily modify the image of the fingerprint or the naturally occurring fingerprint of the user.

FIG. 6C illustrates another example of enhanced biometric data. The enhanced biometric data 640 includes the naturally occurring fingerprint 642 of the user, as well as an enhancement 644. As shown in FIG. 6C, the enhancement 644 is arranged to not overlay the fingerprint 622 of the user, such that the entire fingerprint 622 is visible and/or readable, along with the enhancement.

The examples of enhanced biometric data shown may be projected as an image from a remote user computing device, may be printed as a sticker or other adhesive device, such as a temporary tattoo that can be worn by the user, or the like. As discussed herein, the enhanced biometric data may temporarily modify the biometric data of the user such that the enhanced biometric data will be deactivated upon occurrence of a triggering event.

Figure 7:
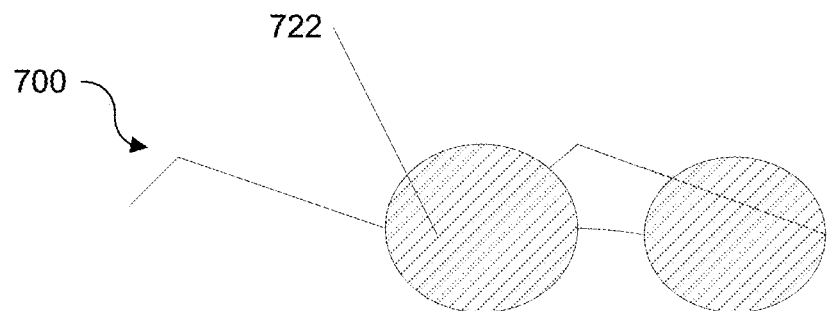
FIG. 7 illustrates another example implementation of enhanced biometric data in accordance with one or more aspects described herein.

Although several aspects discussed herein are directed to providing enhanced biometric data in the form of fingerprint data, other types of biometric data may also be used. For example, FIG. 7 illustrates another example of enhanced biometric data that may be used with a retinal or iris scan of a user. In some examples, the enhancement 724 may appear on a lens of a pair of glasses 700. In some examples, the glasses 700 may be augmented reality glasses. In other examples, the glasses 700 may be traditional glasses to which an enhanced biometric data output is adhered. The enhancement 724 may include data associated with the user profile, such as limits, criteria for processing events, and the like. Similar to the other examples discussed herein, the enhancement 724 may permit some or all of the naturally occurring biometric data (e.g., iris or retina) to be visible or readable through the lens in addition to the enhancement.

Figure 8:
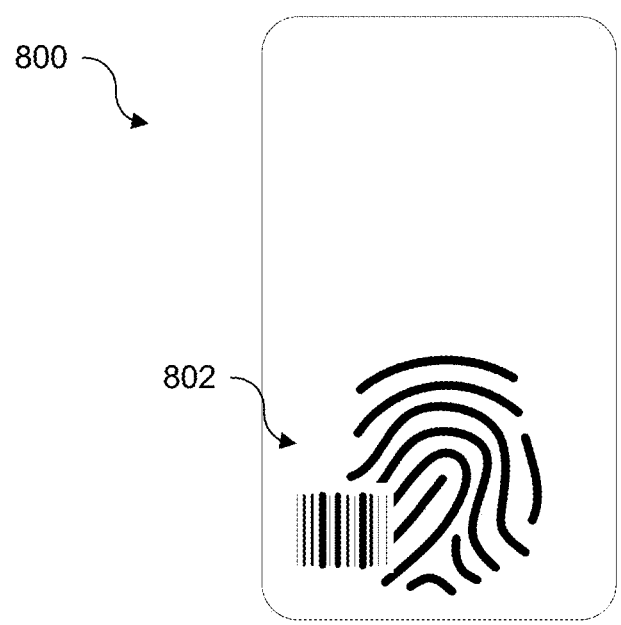
FIG. 8 illustrates yet another example implementation of enhanced biometric data in accordance with one or more aspects described herein.

FIG. 8 illustrates yet another example of enhanced biometric data. FIG. 8 includes a mobile device 800, such as a smartphone. The mobile device 800 may be a wearable device or other suitable device. The enhanced biometric data 802 is shown on a rear of the mobile device 800. As discussed herein, the enhanced biometric data output may be a sticker or other adhesive device and may adhere to a mobile device 800, or other device. In examples, in which the enhanced biometric data is transmitted to a user other than the requesting user (e.g., an authorized agent of the requesting user), the enhanced biometric data may be printed and adhered to a device, such as mobile device 800 to enable the authorized agent to process events for the requesting user without the requesting user being present to provide his or her biometric data.

As discussed herein, the arrangements described provide for improved flexibility and security when using biometric data to process events. For instance, the use of enhanced biometric data that can be deactivated after a triggering event makes biometric data more difficult to duplicate in order to engage in unauthorized activity. As biometric data is used more often in event processing, the risk of exposure of the biometric data to potential unauthorized actors increases. Accordingly, by temporarily modifying the biometric data (e.g., creating a tokenized imprint or image to enhanced the natural biometric data of the user) with additional data in generating the enhanced biometric data, there is less risk of an unauthorized actor obtaining and duplicating the biometric data of the user.

As discussed above, the enhanced biometric data may be output onto an enhanced biometric data output. In some examples, the enhancement and/or biometric data may be distributed among two or more different enhanced biometric outputs. Accordingly, in some examples, all of the enhanced biometric outputs may be required in order to process an event. This may add an additional layer of security in event processing.

The enhanced biometric data may be used to facilitate secure event processing for a user. For example, a user may select (or the system may select) a user profile including limits for transaction amounts, a predetermined time period for which the enhanced biometric data will be active, and the like. For instance, if a user is going on vacation, he or she may want to limit the potential risk of unauthorized activity. Accordingly, enhanced biometric data may be generated from a "vacation" user profile that includes a limit of $250 on any transaction processed (or authorized for processing) using the enhanced biometric data and may deactivate the enhanced biometric data after one week.

Additionally or alternatively, the enhanced biometric data may be used to permit an authorized agent of a user to process events without requiring the presence of the user. For instance, a user may generate enhanced biometric data and transmit it to the mobile device of a caretaker, of a child away at college, or the like. Accordingly, the recipient can process events (within the limits established by the user profile used to generate the enhanced biometric data) without the user being present to provide biometric data.

In some examples, the enhanced biometric data and/or enhanced biometric data output may be transferable. For instance, the enhanced biometric data output may be generated for an initial user and then may be transferred to a second, different user. In some examples, this may include removal of the adhesive device from a first location and adhering it to a second location. In examples, in which the enhanced biometric data output is a projection of an image, the image may be transmitted from a first computing device to a second computing device. In some examples, transmission of the image for projection to the second device may include deactivating the image on the first device.

In some arrangements, transferring the enhanced biometric data or enhanced biometric data output may be used in family situations. For instance, if a family is on a trip, the enhanced biometric data may be transferred from one family member to another to enable all family members to use the enhanced biometric data and/or enhanced biometric data output as desired.

Figure 9:
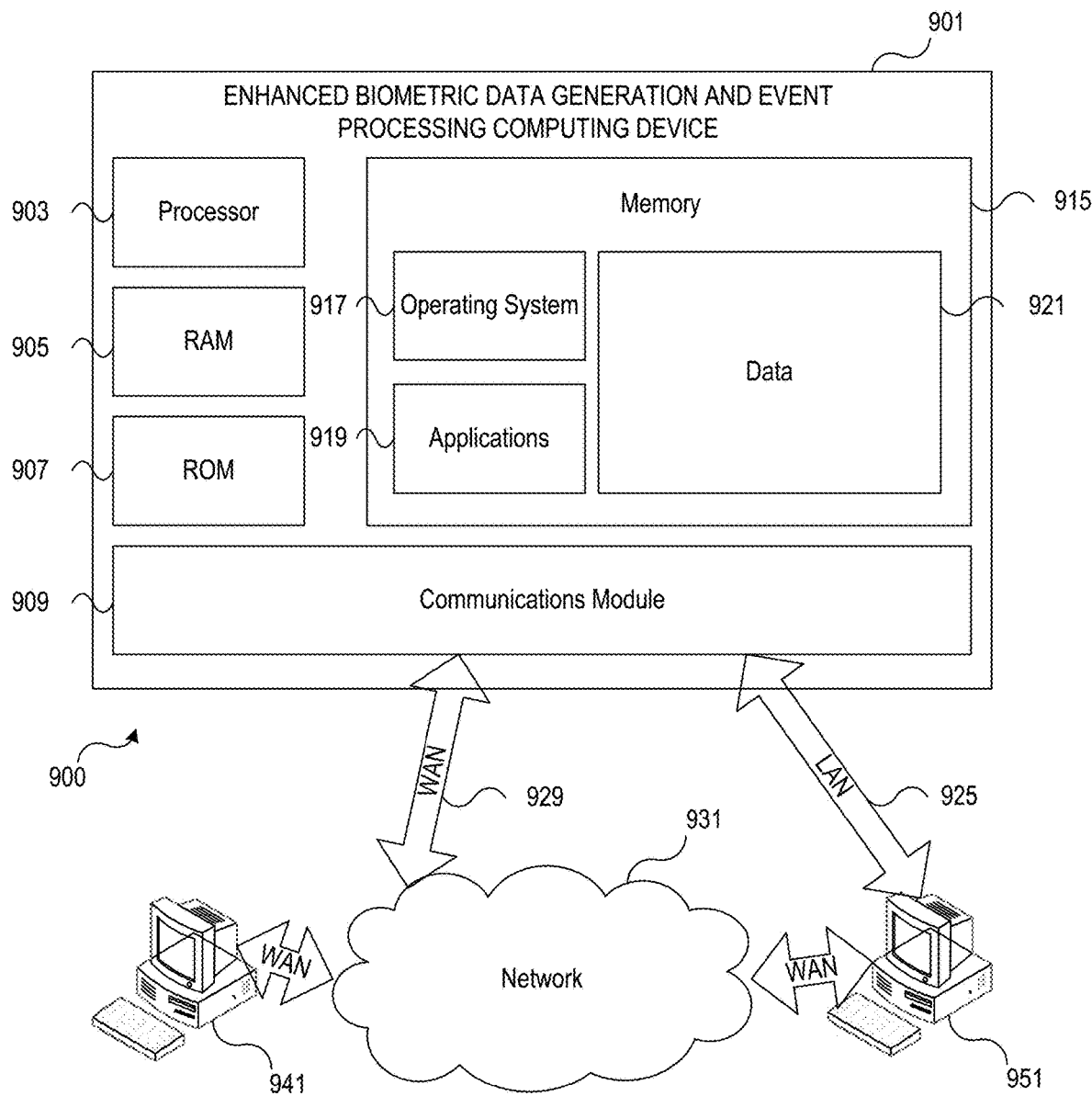
FIG. 9 illustrates one example operating environment in which various aspects of the disclosure may be implemented in accordance with one or more aspects described herein.

FIG. 9 depicts an illustrative operating environment in which various aspects of the present disclosure may be implemented in accordance with one or more example embodiments. Referring to FIG. 9, computing system environment 900 may be used according to one or more illustrative embodiments. Computing system environment 900 is only one example of a suitable computing environment and is not intended to suggest any limitation as to the scope of use or functionality contained in the disclosure. Computing system environment 900 should not be interpreted as having any dependency or requirement relating to any one or combination of components shown in illustrative computing system environment 900.

Computing system environment 900 may include enhanced biometric data generation and event processing computing device 901 having processor 903 for controlling overall operation of enhanced biometric data generation and event processing computing device 901 and its associated components, including Random Access Memory (RAM) 905, Read-Only Memory (ROM) 907, communications module 909, and memory 915. Enhanced biometric data generation and event processing computing device 901 may include a variety of computer readable media. Computer readable media may be any available media that may be accessed by enhanced biometric data generation and event processing computing device 901, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 901.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on enhanced biometric data generation and event processing computing device 901. Such a processor may execute computer-executable instructions stored on a computer-readable medium.

Software may be stored within memory 915 and/or storage to provide instructions to processor 903 for enabling enhanced biometric data generation and event processing computing device 901 to perform various functions as discussed herein. For example, memory 915 may store software used by enhanced biometric data generation and event processing computing device 901, such as operating system 917, application programs 919, and associated database 921. Also, some or all of the computer executable instructions for enhanced biometric data generation and event processing computing device 901 may be embodied in hardware or firmware. Although not shown, RAM 905 may include one or more applications representing the application data stored in RAM 905 while enhanced biometric data generation and event processing computing device 901 is on and corresponding software applications (e.g., software tasks) are running on enhanced biometric data generation and event processing computing device 901.

Communications module 909 may include a microphone, keypad, touch screen, and/or stylus through which a user of enhanced biometric data generation and event processing computing device 901 may provide input, and may also include one or more of a speaker for providing audio output and a video display device for providing textual, audiovisual and/or graphical output. Computing system environment 900 may also include optical scanners (not shown).

Enhanced biometric data generation and event processing computing device 901 may operate in a networked environment supporting connections to one or more remote computing devices, such as computing devices 941 and 951. Computing devices 941 and 951 may be personal computing devices or servers that include any or all of the elements described above relative to enhanced biometric data generation and event processing computing device 901.

The network connections depicted in FIG. 9 may include Local Area Network (LAN) 925 and Wide Area Network (WAN) 929, as well as other networks. When used in a LAN networking environment, enhanced biometric data generation and event processing computing device 901 may be connected to LAN 925 through a network interface or adapter in communications module 909. When used in a WAN networking environment, enhanced biometric data generation and event processing computing device 901 may include a modem in communications module 909 or other means for establishing communications over WAN 929, such as network 931 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 10:
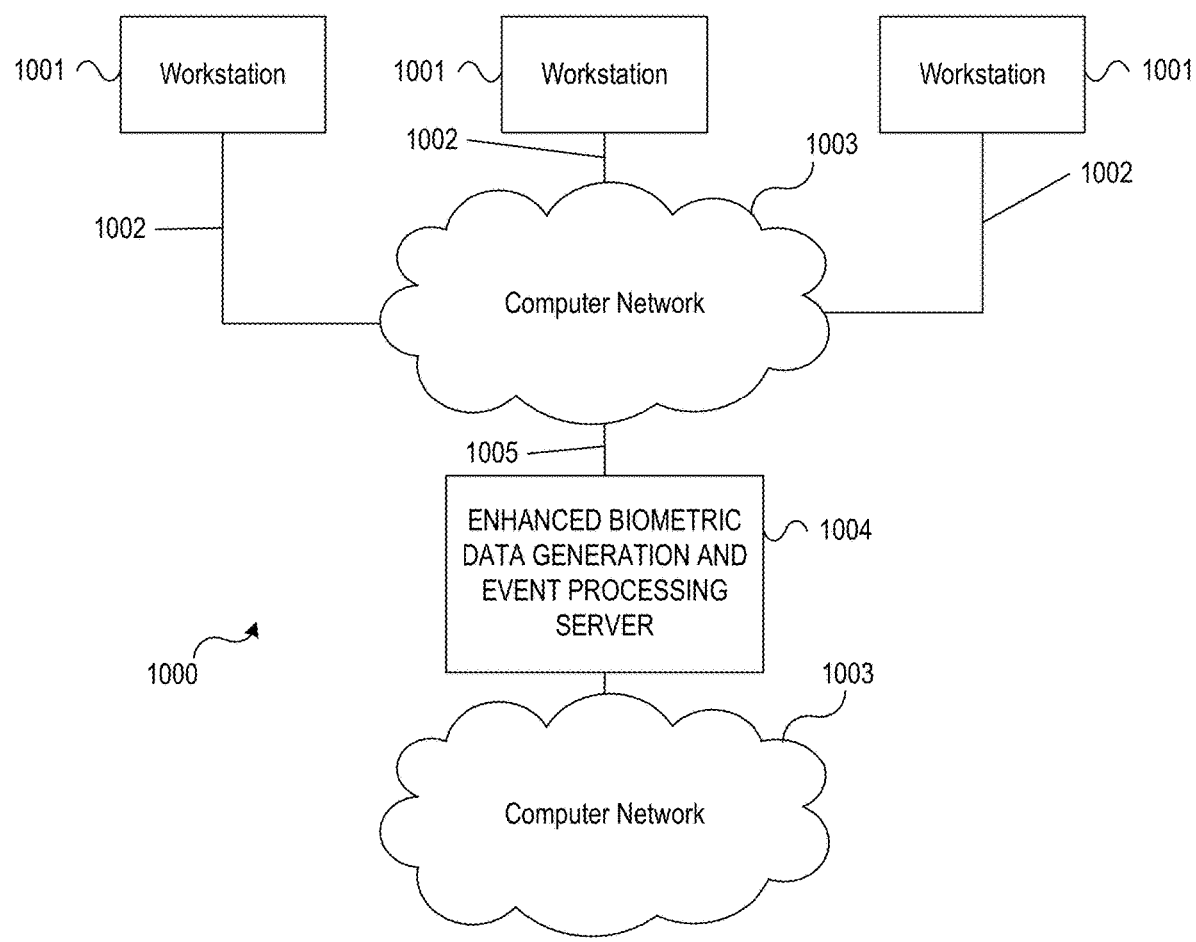
FIG. 10 depicts an illustrative block diagram of workstations and servers that may be used to implement the processes and functions of certain aspects of the present disclosure in accordance with one or more aspects described herein.

FIG. 10 depicts an illustrative block diagram of workstations and servers that may be used to implement the processes and functions of certain aspects of the present disclosure in accordance with one or more example embodiments. Referring to FIG. 10, illustrative system 1000 may be used for implementing example embodiments according to the present disclosure. As illustrated, system 1000 may include one or more workstation computers 1001. Workstation 1001 may be, for example, a desktop computer, a smartphone, a wireless device, a tablet computer, a laptop computer, and the like, configured to perform various processes described herein. Workstations 1001 may be local or remote, and may be connected by one of communications links 1002 to computer network 1003 that is linked via communications link 1005 to enhanced biometric data generation and event processing server 1004. In system 1000, enhanced biometric data generation and event processing server 1004 may be a server, processor, computer, or data processing device, or combination of the same, configured to perform the functions and/or processes described herein. Server 1004 may be used to receive requests for enhanced biometric data, process requests, receive requests for event processing, evaluate received enhanced biometric data, deactivate enhanced biometric data, and the like.

Computer network 1003 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 1002 and 1005 may be communications links suitable for communicating between workstations 1001 and enhanced biometric data generation and event processing server 1004, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   non-transitory memory storing computer-readable instructions that, when executed by the at least one processor, cause the computing platform to:
   receive user input requesting enhanced biometric data including both naturally occurring biometric data and machine readable data associated with a user, the user input including additional information associated with the request and the user input received from a user computing device associated with the user;
   identify, based on the user input, a user associated with the request;
   retrieve, from a database and based on the additional information and the user associated with the request, a user profile of the identified user from a plurality of user profiles associated with the user, the user profile including at least pre-stored biometric data of the user;
   generate, based on the user profile, the enhanced biometric data, the enhanced biometric data including the naturally occurring biometric data of the identified user and the machine readable data associated with the user, the machine readable data indicating one or more limits on use of the enhanced biometric data; and
   transmit the generated enhanced biometric data to the user computing device.

2. The computing platform of claim 1, further including instructions that, when executed, cause the computing platform to:
   cause the user computing device to generate an enhanced biometric data output.

3. The computing platform of claim 2, wherein the enhanced biometric data output is an image projected by the user computing device and including the enhanced biometric data.

4. The computing platform of claim 2, wherein the enhanced biometric data output is an adhesive device including the enhanced biometric data.

5. The computing platform of claim 2, further including instructions that, when executed, cause the computing platform to:
   receive a request to process an event, the request to process the event including event details;
   receive the generated enhanced biometric data;
   compare the received enhanced biometric data to pre-stored biometric data of the user from the user profile;
   responsive to determining that at least a portion of the received enhanced biometric data matches the pre-stored biometric data, comparing the event details to the one or more limits from the enhanced biometric data;
   responsive to determining that the event details are within the one or more limits from the enhanced biometric data, processing the requested event;

responsive to determining that at least a portion of the received enhanced biometric data does not match the pre-stored biometric data, denying the request to process the event; and responsive to determining that the event details are not within the one or more limits from the enhanced biometric data, denying the request to process the event.

6. The computing platform of claim 1, wherein the machine readable data includes at least one of: a bar code and a quick response code.

7. The computing platform of claim 1, wherein the plurality of user profiles each include one or more different predetermined limits on use of the enhanced biometric data generated based on a respective user profile.

8. A method, comprising:
at a computing platform comprising at least one processor, memory, and a communication interface:
receiving, by the at least one processor and via the communication interface, user input requesting enhanced biometric data including both naturally occurring biometric data and machine readable data associated with a user, the user input including additional information associated with the request and the user input received from a user computing device associated with the user;
identifying, by the at least one processor and based on the user input, a user associated with the request;
retrieving, by the at least one processor and from a database and based on the additional information and the user associated with the request, a user profile of the identified user from a plurality of user profiles, the user profile including at least pre-stored biometric data of the user;
generating, by the at least one processor and based on the user profile, the enhanced biometric data, the enhanced biometric data including the naturally occurring biometric data of the identified user and the machine readable data associated with the user, the machine readable data indicating one or more limits on use of the enhanced biometric data; and
transmitting, by the at least one processor and via the communication interface, the generated enhanced biometric data to the user computing device.

9. The method of claim 8, further including causing, by the at least one processor, the user computing device to generate an enhanced biometric data output.

10. The method of claim 9, wherein the enhanced biometric data output is an image projected by the user computing device and including the enhanced biometric data.

11. The method of claim 9, wherein the enhanced biometric data output is an adhesive device including the enhanced biometric data.

12. The method of claim 9, further including:
receiving, by the at least one processor and via the communication interface, a request to process an event, the request to process the event including event details;
receiving, by the at least one processor and via the communication interface, the generated enhanced biometric data;
comparing, by the at least one processor, the received enhanced biometric data to pre-stored biometric data of the user from the user profile;
responsive to determining that at least a portion of the received enhanced biometric data matches the pre-stored biometric data, comparing the event details to the one or more limits from the enhanced biometric data; and
responsive to determining that the event details are within the one or more limits from the enhanced biometric data, processing the requested event.

13. The method of claim 9, further including:
receiving, by the at least one processor and via the communication interface, a request to process an event, the request to process the event including event details;
receiving, by the at least one processor and via the communication interface, the generated enhanced biometric data;
comparing, by the at least one processor, the received enhanced biometric data to pre-stored biometric data of the user from the user profile;
responsive to determining that at least a portion of the received enhanced biometric data does not match the pre-stored biometric data, denying the request to process the event.

14. The method of claim 8, wherein the machine readable data includes at least one of: a bar code and a quick response code.

15. The method of claim 8, wherein the plurality of user profiles each include one or more different predetermined limits on use of the enhanced biometric data generated based on a respective user profile.

16. One or more non-transitory computer-readable media storing instructions that, when executed by a computing platform comprising at least one processor, memory, and a communication interface, cause the computing platform to:
receive user input requesting enhanced biometric data including both naturally occurring biometric data and machine readable data associated with a user, the user input including additional information associated with the request and the user input received from a user computing device associated with the user;
identify, based on the user input, a user associated with the request;
retrieve, from a database and based on the additional information and the user associated with the request, a user profile of the identified user from a plurality of user profiles, the user profile including at least pre-stored biometric data of the user;
generate, based on the user profile, the enhanced biometric data, the enhanced biometric data including the naturally occurring biometric data of the identified user and, the machine readable data associated with the user, the machine readable data indicating one or more limits on use of the enhanced biometric data; and
transmit the generated enhanced biometric data to the user computing device.

17. The one or more non-transitory computer-readable media of claim 16, further including instructions that, when executed, cause the computing platform to:
cause the user computing device to generate an enhanced biometric data output.

18. The one or more non-transitory computer-readable media of claim 17, wherein the enhanced biometric data output is an image projected by the user computing device and including the enhanced biometric data.

19. The one or more non-transitory computer-readable media of claim 17, wherein the enhanced biometric data output is an adhesive device including the enhanced biometric data.

20. The one or more non-transitory computer-readable media of claim 17, further including instructions that, when executed, cause the computing platform to:

receive a request to process an event, the request to process the event including event details;

receive the generated enhanced biometric data;

compare the received enhanced biometric data to pre-stored biometric data of the user from the user profile;

responsive to determining that at least a portion of the received enhanced biometric data matches the pre-stored biometric data, comparing the event details to the one or more limits from the enhanced biometric data;

responsive to determining that the event details are within the one or more limits from the enhanced biometric data, processing the requested event;

responsive to determining that at least a portion of the received enhanced biometric data does not match the pre-stored biometric data, denying the request to process the event; and responsive to determining that the event details are not within the one or more limits from the enhanced biometric data, denying the request to process the event.

21. The one or more non-transitory computer-readable media of claim 16, wherein the machine readable data includes at least one of: a bar code and a quick response code.

22. The one or more non-transitory computer-readable media of claim 16, wherein the plurality of user profiles each include one or more different predetermined limits on use of the enhanced biometric data generated based on a respective user profile.

* * * * *